United States Patent
Nagata et al.

(10) Patent No.: US 8,908,660 B2
(45) Date of Patent: Dec. 9, 2014

(54) GATEWAY APPARATUS, NODE APPARATUS, COMMUNICATION SYSTEM, CONTROL METHOD AND COMPUTER READABLE MEDIUM

(71) Applicant: Fujitsu Limited, Kawasaki-shi (JP)

(72) Inventors: Nami Nagata, Kawasaki (JP); Jun Ibuki, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 71 days.

(21) Appl. No.: 13/712,744

(22) Filed: Dec. 12, 2012

(65) Prior Publication Data

US 2013/0242806 A1 Sep. 19, 2013

(30) Foreign Application Priority Data

Mar. 19, 2012 (JP) ................................ 2012-062854

(51) Int. Cl.
| | | |
|---|---|---|
| H04B 7/212 | (2006.01) | |
| H04W 72/04 | (2009.01) | |
| H04W 28/02 | (2009.01) | |
| H04W 88/16 | (2009.01) | |
| H04W 40/16 | (2009.01) | |
| H04L 12/753 | (2013.01) | |
| H04W 72/08 | (2009.01) | |

(52) U.S. Cl.
CPC .......... *H04W 72/0446* (2013.01); *H04W 40/16* (2013.01); *H04W 28/0236* (2013.01); *H04L 45/48* (2013.01); *H04W 88/16* (2013.01); *H04W 72/082* (2013.01)
USPC .......................................................... 370/337

(58) Field of Classification Search
None
See application file for complete search history.

(56) References Cited

U.S. PATENT DOCUMENTS

| | | | |
|---|---|---|---|
| 6,414,955 B1 * | 7/2002 | Clare et al. ..................... | 370/390 |
| 7,411,919 B2 | 8/2008 | Tavli et al. | |
| 7,570,593 B1 * | 8/2009 | ElBatt et al. ................... | 370/238 |
| 8,031,605 B2 * | 10/2011 | Oyman et al. ................. | 370/235 |
| 8,228,934 B2 | 7/2012 | Jeong et al. | |
| 2008/0031197 A1 * | 2/2008 | Wang et al. .................... | 370/331 |
| 2011/0255431 A1 | 10/2011 | Wang et al. | |
| 2012/0257545 A1 * | 10/2012 | Al Agha et al. ............... | 370/255 |

FOREIGN PATENT DOCUMENTS

| | | |
|---|---|---|
| JP | 2010-171917 | 8/2010 |
| WO | WO 2009/132143 | 10/2009 |

OTHER PUBLICATIONS

"Extended European Search Report" mailed by EPO and corresponding to European application No. 12197732.6 on Sep. 4, 2013.

* cited by examiner

*Primary Examiner* — Christopher Crutchfield
(74) *Attorney, Agent, or Firm* — Fujitsu Patent Center

(57) ABSTRACT

A gateway apparatus that connects a multi-hop network of tree structure formed of node apparatuses to other network, comprising a grouping unit that groups, for each representative node apparatus having a direct link to the gateway apparatus in the tree structure, the nodes belonging to a subtree having same representative node as a root, into a node group, an interference group specifying unit that specifies a node group in which packet communication in the node group is subjected to an interference of a degree exceeding a threshold as an interference group, and a slot allocation unit that allocates some one time slot among a plurality of time slots included in a frame to one interference group among a plurality of interference groups, and allocates another time slot among the plurality of time slots to another interference group among the plurality of interference groups.

15 Claims, 22 Drawing Sheets

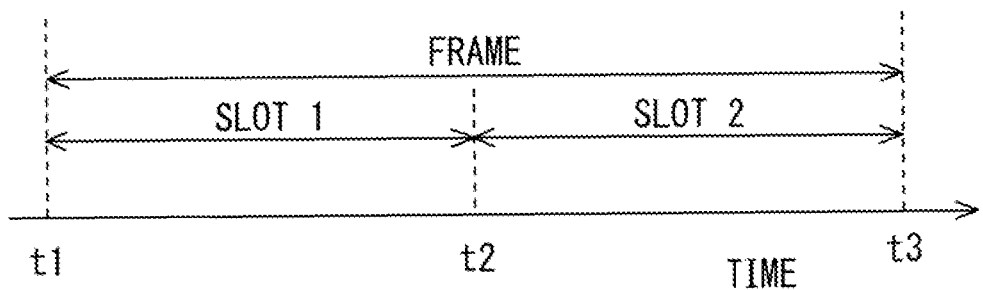

FIG.21A
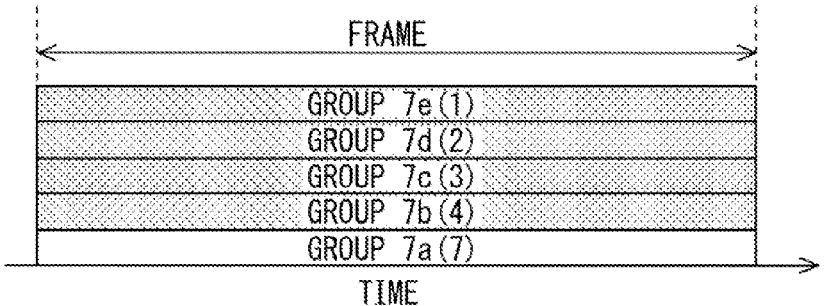
FIG.21B
| ALLOCATION MODE | SLOT 1 | SLOT 2 |
|---|---|---|
| 1 | 7a(7), 7b(4), 7c(3) | 7d(2), 7e(1) |
| 2 | 7a(7), 7b(4), 7d(2) | 7c(3), 7e(1) |
| 3 | 7a(7), 7b(4), 7e(1) | 7c(3), 7d(2) |
| 4 | 7a(7), 7c(3), 7d(2) | 7b(4), 7e(1) |
| 5 | 7a(7), 7c(3), 7e(1) | 7b(4), 7d(2) |
| 6 | 7a(7), 7d(2), 7e(1) | 7b(4), 7c(3) |
FIG.21C
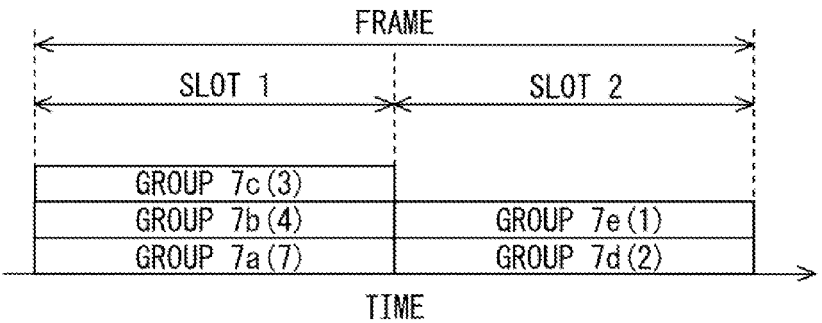

GATEWAY APPARATUS, NODE APPARATUS, COMMUNICATION SYSTEM, CONTROL METHOD AND COMPUTER READABLE MEDIUM

CROSS-REFERENCE TO RELATED APPLICATIONS

This application is based upon and claims the benefit of priority of the prior Japanese Patent Application No. 2012-062854, filed on Mar. 19, 2012, the entire contents of which are incorporated herein by reference.

FIELD

Embodiments described in the present specification relate to reduction of packet collisions in a multi-hop network.

BACKGROUND

As a technology for reducing packet collisions in a multi-hop network, a wireless network is known in which a first wireless network group transmits packets in a first time point and then a second wireless network group transmits packets at a second time point. By thus transmitting packets in a slide scheme, packet collisions due to transmission of packets at the same time point can be avoided.

Related art is disclosed in Japanese National Publication of International Patent Application No. 2010-171917.

SUMMARY

In accordance with an aspect of the apparatus, there is provided a gateway apparatus that connects a multi-hop network having a tree structure formed of node apparatuses to another network. The gateway apparatus includes a grouping unit that groups, for each representative node apparatus having a direct link to the gateway apparatus in the tree structure, those nodes belonging to a subtree having the same representative node as a group, an interference group specifying unit that specifies a node group in which packet communication in the node group is subjected to an interference of a degree exceeding a threshold, and a slot allocation unit that allocates some one time slot from among a plurality of time slots included in a frame as packet transmission period to one interference group from among a plurality of interference groups as packet transmission period, and other time slot from among the plurality of time slots as packet transmission period to another interference group from among the plurality of interference groups.

In accordance with another aspect of the apparatus, there is provided node apparatuses forming a multi-hop network having tree structure connected by a gateway apparatus to another network. In a plurality of node groups formed by grouping, for each representative node apparatus having a direct link to the gateway apparatus in the tree structure, node apparatuses belonging to a same subtree having a same representative node apparatus as a root, a node apparatus includes an interference measurement unit that measures the degree of interference to which packet communication in the node group of the node apparatus is subjected, and an interference notification unit that outputs, to the gateway apparatus, a comparison result obtained by comparing the degree of interference measured when the node group of the node apparatus is operated alone with the degree of interference measured the node group of the nose apparatus is operated simultaneously with other node group from among a plurality of node groups.

In accordance with still another aspect of the apparatus, there is provided a communication system including a multi-hop network of tree structure formed of node apparatuses and a gateway apparatus connecting the multi-hop network to other network. The gateway apparatus includes a grouping unit that groups, for each representative node apparatus having direct link to the gateway apparatus in the tree structure, nodes belonging to a same subtree having a same representative node apparatus as a root into a node group, an interference group specifying unit that specifies a node group for which packet communication in the node group is subjected to a degree of interference exceeding a threshold as an interference group, and a slot allocation unit that allocates one time slot from among a plurality of time slots included in a frame as packet transmission period to an interference group from among a plurality of interference groups as packet transmission period, and other time slot from among the plurality of time slots to another interference group from among the plurality of interference groups as a packet transmission period.

In accordance with an aspect of the method, there is provided a control method for controlling a operation period of node apparatuses forming a multi-hop network of a tree structure connected by a gateway apparatus to another network. The control method includes, for each representative node apparatus having a direct link to the gateway apparatus, grouping nodes belonging to a subtree having the representative node apparatus as a root into node groups, specifying a node group for which packet communication in the node group is subjected to a degree of interference exceeding a threshold as an interference group, and allocating one time slot from among a plurality of time slots included in a frame as packet transmission period to one interference group as packet transmission period from among a plurality of interference groups, and another time slot from among the plurality of time slots to another interference group as a packet transmission period from among the plurality of interference groups.

In accordance with an aspect of the computer-readable medium, there is provided a computer-readable, non-transitory medium storing a computer program for causing a processor comprised in a gateway apparatus connecting a multi-hop network of a tree structure formed of node apparatuses to another network to execute grouping, for each representative node apparatus having a direct link to the gateway apparatus in the tree structure, the node apparatuses belonging to a subtree having the representative node apparatus as the root into a node group, specifying a node group in which packet communication is subjected to interference of a degree exceeding a threshold as an interference group, and allocating one time slot from among a plurality of time slots included in a frame as a packet transmission period of the node apparatus to one interference group from among a plurality of interference groups as a packet transmission period, and another time slot from among the plurality of time slots to another interference group from among the plurality of interference groups as a packet transmission period.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7A is a view for illustrating an example of schedule information.

FIG. 7B is a view for illustrating an example of schedule information.

FIG. 7C is a view for illustrating an example of schedule information.

FIG. 21A is a view for illustrating an example of occurrence of interference increase group.

FIG. 21B is a table of allocation candidates.

FIG. 21C is a view for illustrating an example of time slot allocation.

DESCRIPTION OF EMBODIMENTS

A multi-hop network is divided by grouping the nodes forming the network into a plurality of groups, and packet transmission is permitted to various groups only in time slots different from each other, so that a number of nodes transmitting packets in a same time period can be decreased and packet collisions can be reduced. In order to further reduce packet collisions, it is desirable to reduce packet collision between nodes to which a same time slot is allocated.

It is an object of the apparatus and method described in the present specification to reduce packet collisions between nodes transmitting packets in the same time slot in a multi-hop network.

1. Example of Overall Construction of Communication System

Figure 1:
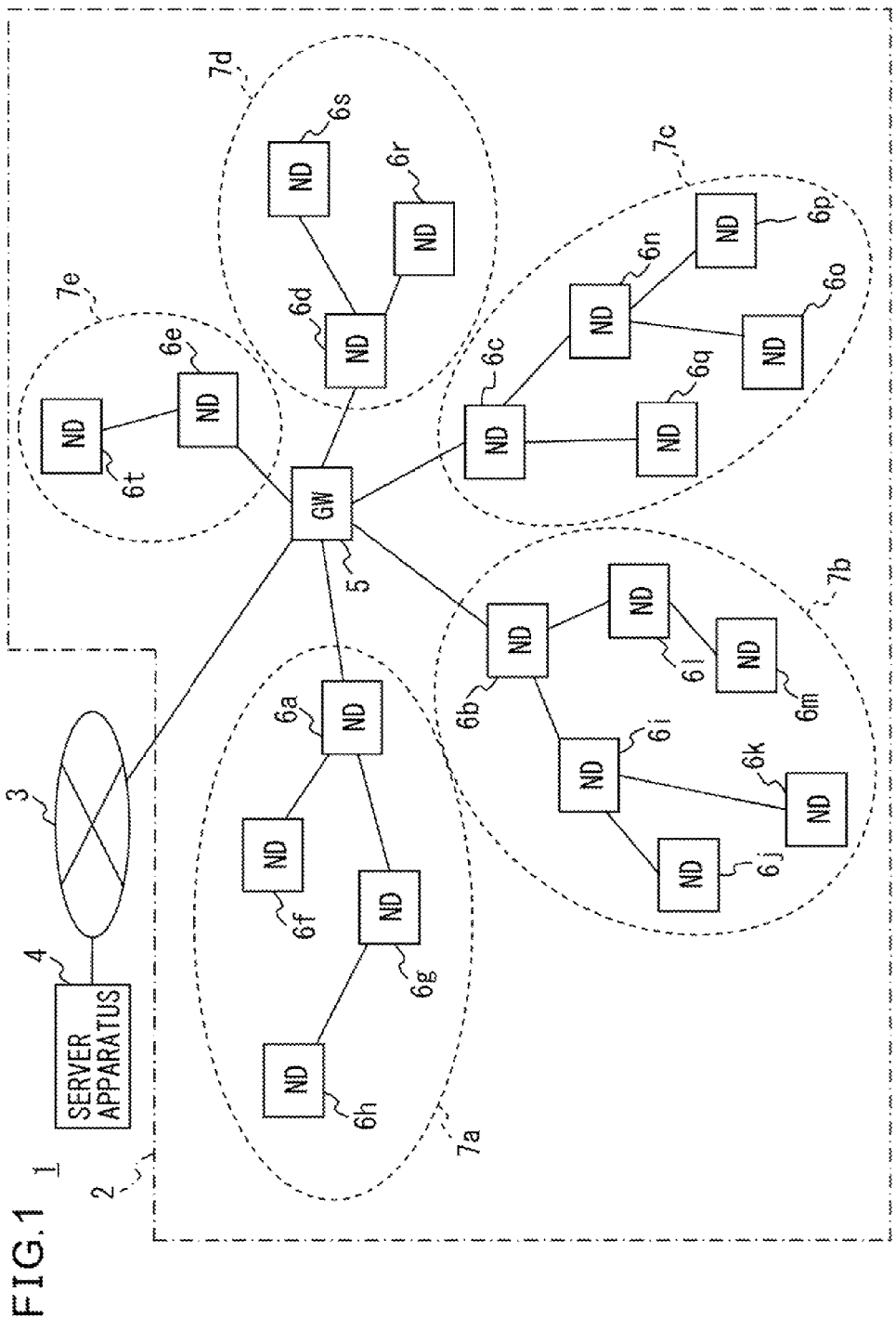
FIG. 1 is a view depicting an exemplary construction of a communication system.

Preferred exemplary embodiments of the invention will be described below with reference to appended drawings. FIG. 1 is a view depicting an exemplary construction of a communication system. The communication system 1 includes a wireless multi-hop network 2, a communication network 3 and a server apparatus 4. The wireless multi-hop network 2 is formed from a gateway apparatus 5, and nodes including sensor node apparatuses 6a to 6t. The communication system 1 may be a data collection system in which meter reading data for power, gas and water consumption gathered by the sensor node apparatuses 6a to 6t are collected via the gateway apparatus 5 by the server apparatus 4.

In the description that follows and in appended drawings, wireless multi-hop network may be denoted simply as "network". Also, in the description that follows, gateway node apparatus may be denoted simply as "gateway", and node apparatus may be denoted as "node". In appended drawings, gateway node apparatus may be denoted simply as "GW", and node apparatus may be denoted as "ND". In the description that follows, nodes 6a to 6t may be collectively denoted as "node 6".

Since destination of packet transmission of a gateway 5 and a node 6 is respectively determines by a routing control protocol, the network 2 has tree structure. The routing control protocol may be, for example, DSR (Dynamic Source Routing), AODV (Ad Hoc On Demand Distance Vector Routing), etc. The routing control protocol may also be OLSR (Optimized Link State Routing), TBRPF (Topology Broadcast Based on Reverse-path Forwarding), etc.

2. Method of Determining Operation Period

Next, a method of determining operation period for node 6 to transmit packets will be described. As the node 6 increases, a total sum of frequency bands used by node 6 for transmission of packets in a same channel exceeds communication capacity of the channel, so that interference between nodes 6 such as collision increases and performance of the network 2 is deteriorated. Thus, the gateway 5 monitors the state of interference between nodes 6, and in accordance with the degree of interference, increases the division number of dividing 1 frame of transmission cycle of packet transmission of nodes 6 into time slots. The gateway 5 divides nodes 6 into groups operating in different time slots. As a result, a number of nodes transmitting packets in the same time period decreases and interference is thereby reduced. In the description that follows, and in appended drawings, time slot may be denoted simply as "slot".

If, in a subtree 7a having child node 6a having a direct link to the gateway 5 as root, the node 6a and the nodes 6f to 6h forming the subtree 7a operate in different time slots, packet relay in the subtree 7a is not completed in 1 frame, resulting in transmission delay. This also applies to subtrees 7b to 7e having child nodes 6b to 6e having direct link to the gateway 5 as roots, respectively. Therefore, the gateway 5 divides, for each subtree 7a to 7e with child node 6a to 6e having a direct link to the gateway 5 as root, nodes 6 into groups and allocates same slot to nodes 6 of a same group.

In the description that follows, child nodes 6a to 6e having a direct link to the gateway 5 are referred to as "representative nodes". Subtrees 7a to 7e are referred to as "groups". Representative nodes 6a to 6e may be collectively denoted as "representative node 6". Groups 7a to 7e may be collectively denoted as group 7.

Interference between nodes 6 may occur not only between nodes 6 in the same group 7, but also between nodes of different groups 7 but operating in a same slot. Thus, when the degree of interference of packet communication is equal to or greater than a threshold, interference may occur between nodes 6 of different groups 7. Therefore, when the degree of interference of packet communication performed in different groups 7 operating in the same slot is equal to or greater than a threshold, the gateway 5 allocates different slots to these groups.

Figure 2A:
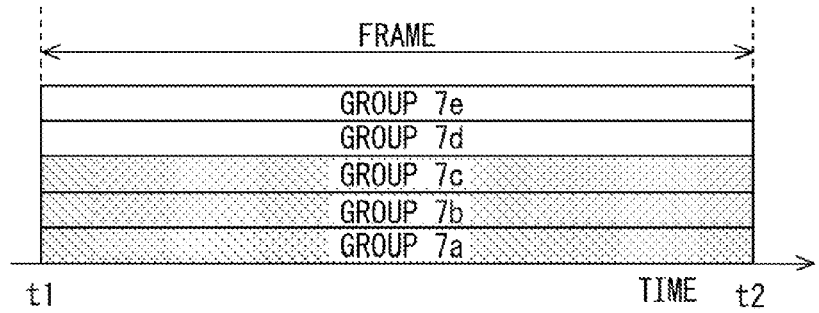
FIG. 2A is a view for illustrating examples of allocation of time slots.

Suppose the case where, as depicted in FIG. 2A, the frame for nodes 6 to perform packet communication is not divided and the start time and the ending time of operation period of nodes 6 coincide with the frame start time t1 and frame ending time t2. Then, the gateway 5 detects whether or not the degree of interference of packet communication in each group 7 exceeds a threshold, for each group 7 in a state of nodes of all the groups 7 in operation.

As an index for indicating the degree of interference, for example, a maximum value of delay time of transmission time for an child node 6 to arrive at a representative node 6, or maximum value of packet error rate (PER) of packet communication between child nodes and a representative node, may be used.

Figure 2B:
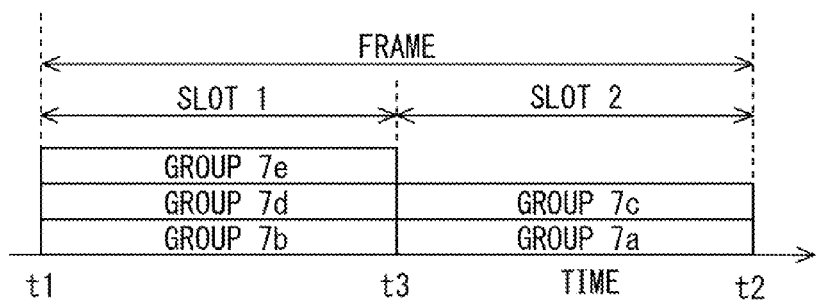
FIG. 2B is a view for illustrating examples of allocation of time slots.

Suppose the case where the degree of interference in the groups 7a to 7c exceeds the threshold. Hatching in the appended drawing indicate the group in which the degree of interference exceeds the threshold. At this time, as depicted in FIG. 2B, the gateway 5 divides the frame into slot 1 and slot 2. Start time of the slot 1 is t1, and ending time is t3 between t1 and t2. Start time and ending time of the slot 2 is t3 and t2, respectively.

The gateway 5 allocates slot 2 to groups 7a and 7c in which the degree of interference exceeds the threshold, and allocates slot 1 to group 7b in which the degree of interference exceeds the threshold. Slot 1 is allocated to groups 7d and 7e. If interference occurred between groups 7b and 7a and between groups 7b and 7c, it can be expected that the degree of interference would be reduced by allotting slots in this way.

The threshold used here may be, for example, the index value indicating the degree of interference measured when each group 7 is operated alone. By using such index value, presence or absence of interference between groups 7 can be judged. A suitable margin may be added to the threshold.

Figure 2C:
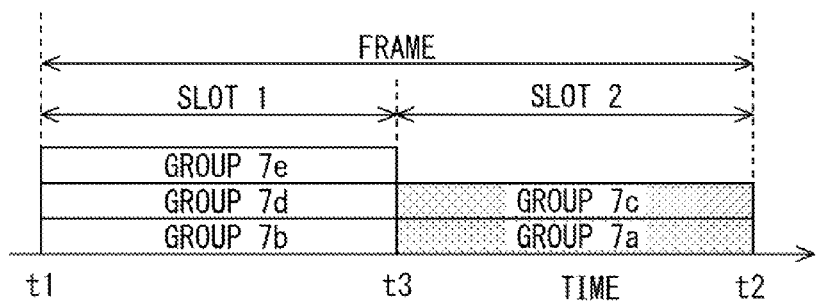
FIG. 2C is a view for illustrating examples of allocation of time slots.
Figure 2D:
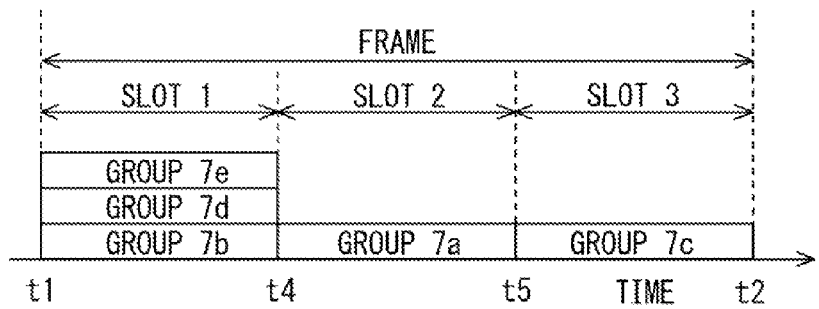
FIG. 2D is a view for illustrating examples of allocation of time slots.

The gateway 5 detects, while groups 7a to 7e are operated in allocated time slots, whether or not the degree of interference affecting packet communication performed in each group 7a to 7e exceeds the threshold. If there are still groups in which the degree of interference exceeds the threshold, addition and allocation of slots is repeated. Suppose that the degree of interference still exceeds the threshold in groups 7a and 7c, as depicted in FIG. 2C. Then, the gateway 5 increases number of slots again. This is depicted in FIG. 2D. Start time of slot 1 is t1 and ending time is time t4 between t1 and t2. Start time of slot 2 is t4 and ending time is time t5 between t4 and t2. Start time and ending time of slot 3 are t5 and t2, respectively.

The gateway 5 again allocates different slots to groups 7a to 7c in which the degree of interference exceeds the threshold. The gateway 5 allocates different slots 2, 3 and 1 respectively to groups 7a to 7c in which the degree of interference exceeds the threshold. The gateway 5 repeats addition and allocation of slots until, in no group, the degree of interference exceeds the threshold.

Figure 3A:
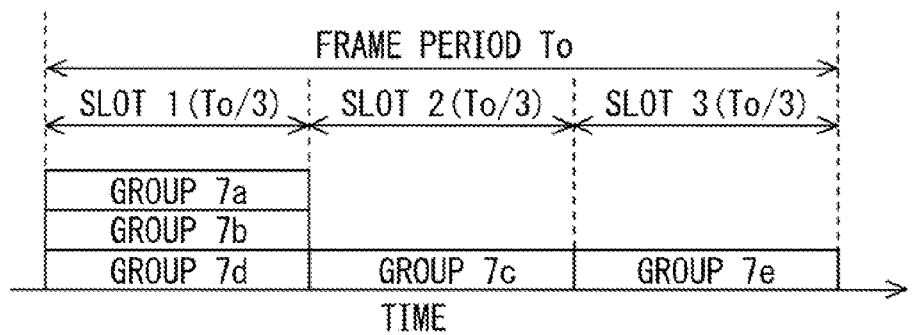
FIG. 3A is a view for illustrating examples of slot length.

Next, an exemplary setting of slot length of slots allocated to groups 7 will be described. For example, the gateway 5 may divide 1 frame equally to generate slots. FIG. 3A depicts slots generated by divided 1 frame equally into 3 slots. Let the frame period be, then slot length of all slots 1 to 3 will be $T_0/3$.

Figure 3B:
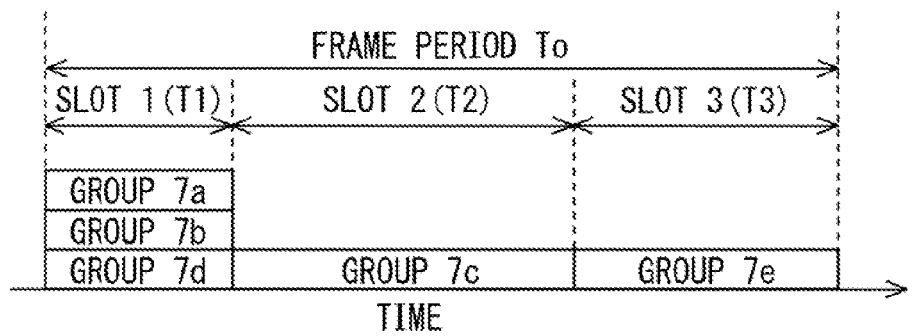
FIG. 3B is a view for illustrating examples of slot length.

The gateway 5 may generate slots of different length in accordance with the maximum of the delay time of groups to which slots are allocated. FIG. 3B depicts an example in which ratio of slot length is determined in accordance with ratio of maximum values of packet delay time of groups to which slots are allocated. Suppose that maximum value of delay time of groups 7a, 7b and 7d to which slot 1 is allocated is d1, maximum value of delay time of groups 7c to which slot 2 is allocated is d2, and maximum value of delay time of groups 7e to which slot 3 is allocated is d3. Then, the gateway 5 determines the slot lengths T1 to T3 of slot 1 to 3 such that T1:T2:T3=d1:d2:d3.

3. First Exemplary Embodiment

<3.1. Exemplary Hardware Construction of Gateway Node Apparatus>

Figure 4:
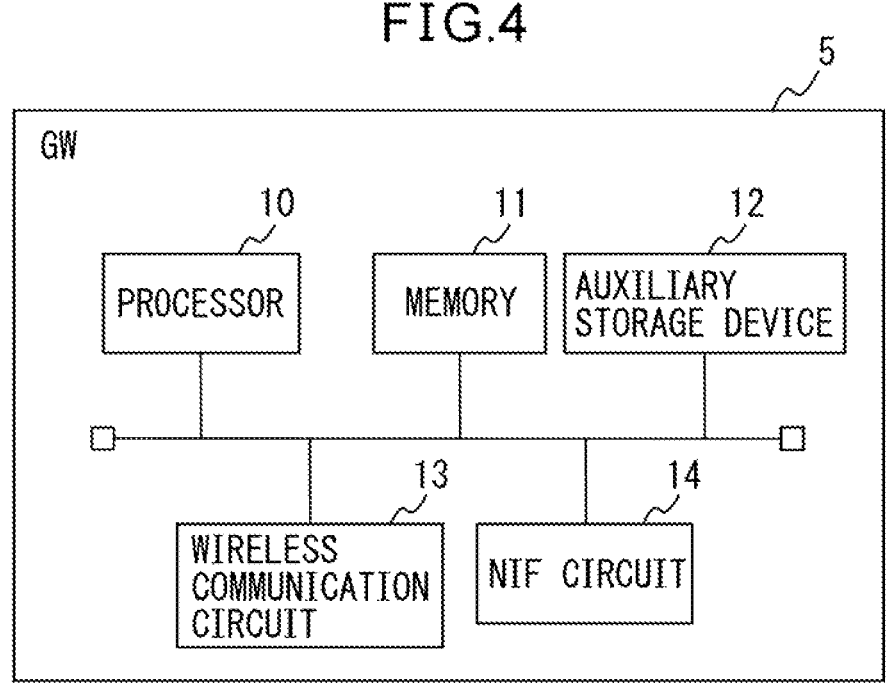
FIG. 4 is a view depicting an example of the hardware construction of a gateway node apparatus.

Next, exemplary embodiment of each constituent of the network 2 will be described. FIG. 4 is a view depicting an example of hardware construction of the gateway 5. The gateway 5 includes a processor 10, a memory 11, an auxiliary storage device 12, a wireless communication circuit 13, and a network interface 14. In the description that follows and in the appended drawings, network interface may be denoted as "NIF". The hardware construction depicted in FIG. 4 is only an example of the hardware construction for realizing the gateway 5. Any other hardware construction may be adopted as long as operations described later in <3.3. Operation of gateway node> can be executed.

The processor 10 executes control program stored in the auxiliary storage device 12 to thereby execute various operations for controlling the gateway 5 and operations to be described later. The auxiliary storage device 12 may include a non-volatile memory, a read-only memory (ROM) and a hard disk as storage device.

The memory 11 stores programs being executed by the processor 11 and data temporarily used by these programs. The memory 11 may include a random-access memory (RAM). The wireless communication network 13 performs wireless communication between nodes 6. NIF circuit 14 performs communication processing with the wireless network 3, and enables transmission and reception of signal to and from the server apparatus 4.

<3.2. Exemplary Functional Construction of Gateway Node Apparatus>

Figure 5:
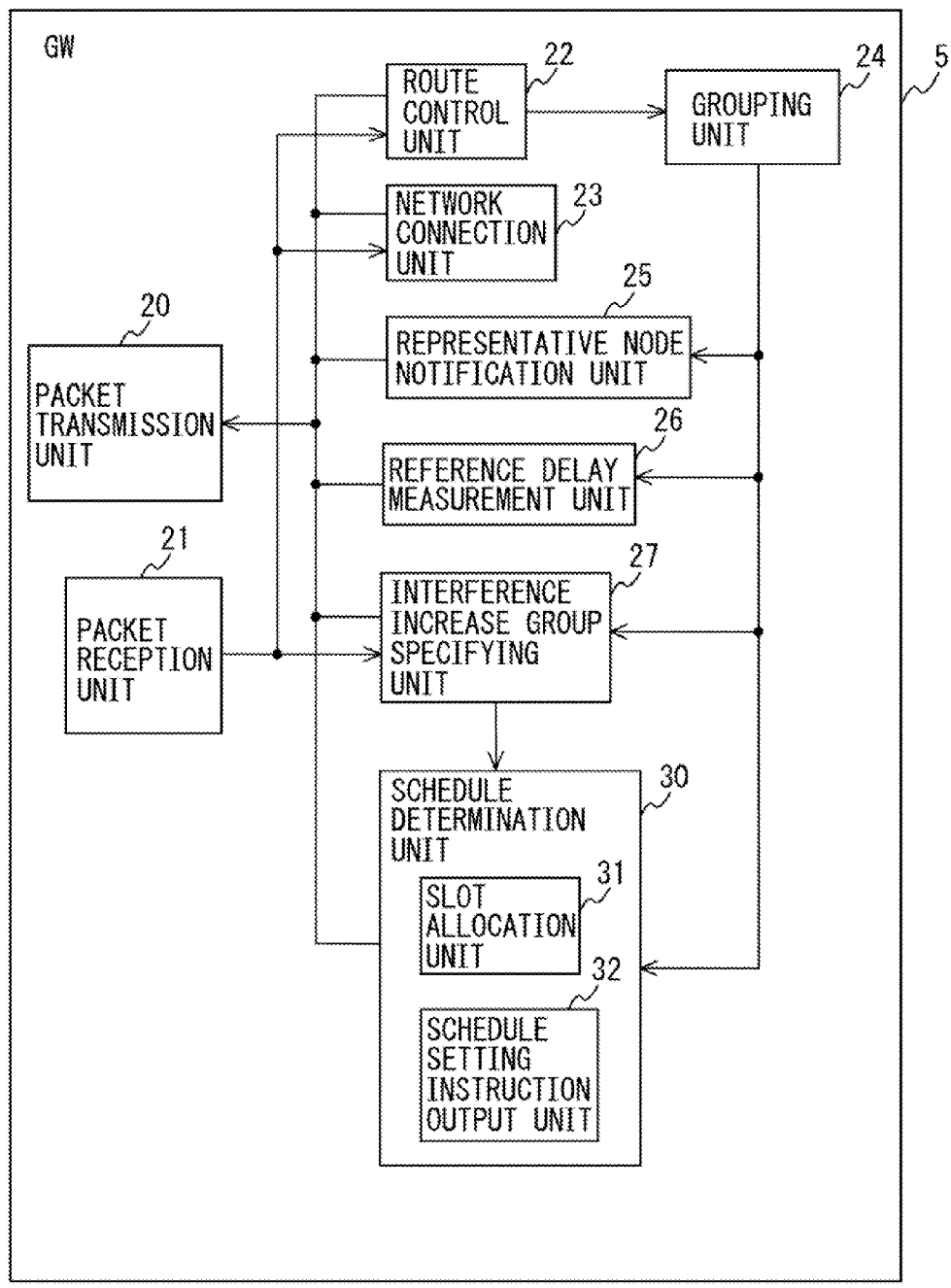
FIG. 5 is a view depicting a first example of functional block of a gateway node apparatus.

Next, functions of the gateway 5 realized by the above hardware will be described. FIG. 5 is a view depicting a first example of functional block of the gateway 5. The gateway 5 includes a packet transmission unit 20, a packet reception unit 21, a route control unit 22, and a network connection unit 23. The gateway 5 includes a grouping unit 24, a representative node notification unit 25, a reference delay measurement control unit 26, an interference increase group specifying unit 27, and a schedule determination unit 30. FIG. 5 depicts mainly those functions relating to the description that follows. The gateway 5 may include constituents other than the constituents depicted in the drawing.

The packet transmission unit 20 and the packet reception unit 21 perform packet transmission to the nodes 6 and packet reception of packets transmitted from the nodes 6 via the wireless communication channel realized by the wireless communication circuit 13. The route control unit 22 constructs routing of the network 2 in accordance with the route control protocol by transmission and reception of route control packets to and from the nodes 6. The network connection unit 23 performs protocol conversion between the communication protocol of the network 2 and the communication protocol of the communication network 3, and connects the network 2 to the communication network 3.

The grouping unit 24 specifies the nodes having direct link to the gateway 5 on the route constructed by the route control unit 22 as representative nodes. The grouping unit 24 groups the nodes 6 into groups 7a to 7e as subtrees respectively having nodes 6a to 6e as roots. The representative node notification unit 25 transmits representative node notification to the representative nodes 6.

The reference delay measurement control unit 26 causes the representative nodes 6 to measure the maximum value of packet delay time in the state where the group 7 it belongs to is operating alone. In the description that follows, the maximum value of packet delay time in the state where the group 7 it belongs to is operating alone is denoted as "reference delay". Also, the reference delays measured in groups 7a to 7e are denoted as Dra, Drb, Drc, Drd and Dre. The reference delays Dra to Dre are collectively denoted as "reference delay Dr".

In measuring the reference delay Dr, for example, the reference delay measurement control unit 26 selects a group from among all the groups 7 successively one by one. The reference delay measurement control unit 26 transmits a stand-by instruction to the representative nodes of non-selected groups, and a reference delay measurement instruction to the representative node 6 of the selected group 7.

The representative node 6 receiving the stand-by instruction transmits a stand-by instruction to the child nodes 6 belonging to its group 7 so as to stop transmission of packets. The representative node 6 receiving the reference delay measurement instruction measures delay time in its group 7. The representative node 6 stores the maximum value of the measured delay time as the reference delay Dr, and transmits a completion notice notifying completion of the reference delay measurement to the gateway 5.

The interference increase group specifying unit 27 causes each representative node 6 to measure, in the state in which all the groups 7 are operating in the same frame, the maximum value of delay time of the group it belongs to.

Here, "the state in which all the groups 7 are operating in the same frame" means, before a frame is divided into slots, a state in which all the groups 7 are operating simultaneously, and after a frame is divided into slots, a state in which all the groups 7 are respectively operating in slots allocated to the same frame.

Delay times measured in a state in which all the groups 7 are operating in the same frame are denoted as Dma, Dmb, Dmc, Dmd and Dme. Delay times Dma to Dme may be collectively denoted as "delay time Dm".

Figure 6A:
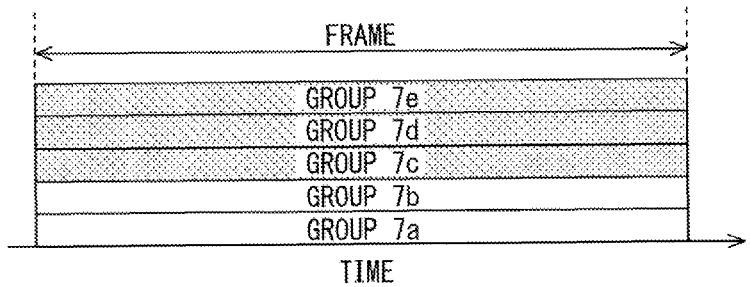
FIG. 6A is a view for illustrating an example of occurrence of interference increase group.

In the description that follows, a group in which the delay time difference, that is, delay time Dm minus reference delay Dr, is greater than a prescribed margin δ is denoted as "interference increase group". The interference increase group specifying unit 27 receives an interference increase notice from the representative node 6 of the interference increase group. FIG. 6A depicts an example of occurrence of interference increase groups to be used later in the description of the first exemplary embodiment. The case where the groups 6c, 6d, and 6e are interference increase groups before division of frame is considered.

The schedule determination unit 30 includes a slot allocation unit 31 and a schedule setting instruction output unit 32. The slot allocation unit 31 increases number of slots when there are interference increase groups. In the first exemplary embodiment, a frame is equally divided to generate slots. The schedule determination unit 30 allocates slots to a interference increase group differently from other from interference increase groups among a plurality of interference increase groups.

In the case of the first time frame division, the schedule determination unit 30 allocates one of slots to all the groups except interference increase groups. In the case of the second time division and thereafter, the schedule determination unit 30 does not change slots for all the groups except interference increase groups. In the description that follows, number of groups determined to be allocated the relevant slot is denoted as "accommodation group number" of the slot.

In allocating slots to interference increase groups, the slot allocation unit 31 determines, for each slot after the increase, number of interference increase groups to be allocated the slot. In the description that follows, number of interference increase groups to be allocated the relevant slot is denoted as "allocation group number". The slot allocation unit 31 determines the allocation group number of each slot so as to minimize difference of allocation group numbers between slots.

Figure 6B:
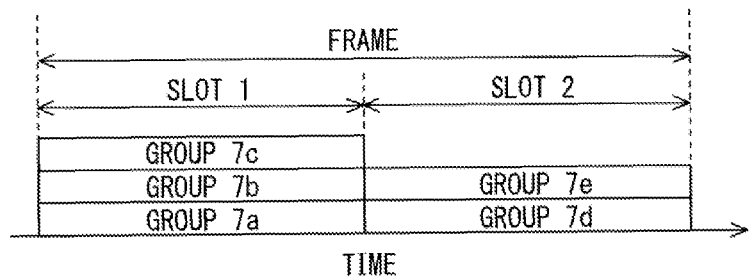
FIG. 6B is a view for illustrating examples of allocation of time slots.

For example, in FIG. 6B, the case where slot number is increased by one, and a frame is divided into slot 1 and slot 2, is considered. The slot allocation unit 31 divides number of interference increase groups, "3", by number of slots, "2", and obtains quotient of "1" and remainder "1". The slot allocation unit 31 increases the allocation group number of some one slot corresponding to the remainder "1" by one from the quotient "1", and determines the allocating group number of other slot to be one corresponding to the quotient "1". By determining the allocation group number in this manner, difference of the allocation group number between slots is minimized to "1" or "0". In the present exemplary embodiment, the slot allocation unit 31 allocates one interference increase group to slot 1 and two interference increase groups to slot 2.

If the remainder of number of the interference increase groups divided by number of slots is not "0", the slot allocation unit 31 may allocate the remaining interference increase group successively one by one in the order starting from the smaller accommodation group number. By allocating in this manner, deviation of a number of groups operating in each slot is reduced, so that interference after reallocation can be reduced.

In the present exemplary embodiment, accommodation group number of the slot 1 allocated to groups 7a and 7b is "2", and accommodation group number of the slot 2 is "0". The slot allocation unit 31 allocates the slot 2 to an interference increase group corresponding to the remainder "1".

Thereafter, the slot allocation unit 31 allocates each slot to interference increase groups in allocation group number determined for each slot. Which slot is to be allocated to an interference increase group may be determined in accordance with a predetermined order of groups, or may be determined randomly. In the present exemplary embodiment, slot 1 is allocated to group 7c and slot 2 is allocated to groups 7d and 7e.

The schedule setting instruction unit 32 generates schedule information of nodes 6 of each group 7 in accordance with the slot allocation allocated by the slot allocation unit 31. FIG. 7A depicts an example of slot, and FIGS. 7B and 7C depict examples of schedule information of group 7 to which slot 1 and slot 2 are allocated, respectively. Times t1, t2 and t3 in FIG. 7A indicate time elapsed from the frame start time. Start time and ending time of slot 1 are times t1 and t2, and start time and ending time of slot 2 are times t2 and t3.

Schedule information depicted in FIGS. 7B and 7C includes information elements, "start time" and "stop time". The information elements "start time" and "stop time" designate start time and stop time of operation for node 6 of group 7 to which each slot is allocated to start and stop operation, respectively, by the elapsed time since the frame start time to respective time points. For example, the start time and the stop time of schedule information of the node 6 of the group 7 to which slot 1 is allocated are start time "t1" of slot 1 and ending time "t2", respectively. The start time and the stop time of schedule information of the node 6 of the group 7 to which slot 2 is allocated are start time "t2" of slot 2 and ending time "t3", respectively.

The schedule setting instruction output unit 32 transmits a schedule setting instruction to representative nodes 6. The schedule setting instruction instructs the representative node 6 to set start time and stop time of the nodes 6 of each group 7 in accordance with the schedule information. Each representative node 6 transfers the schedule setting instruction to child nodes 6 of respective group 7. Each node 6 operates in a respective allocated slot in accordance with the start time and the stop time instructed by the schedule setting instruction, and stops packet communication in other time period.

Thereafter, the interference increase group specifying unit 27 causes each representative node 6 to measure maximum value of delay time of the group 7 in the state wherein all the groups 7 are operating in allocated time slots. In the case where the interference increase group specifying unit 27 receives interference increase notice, the schedule determination unit 30 again carries out addition and allocation of slots.

Figure 6C:
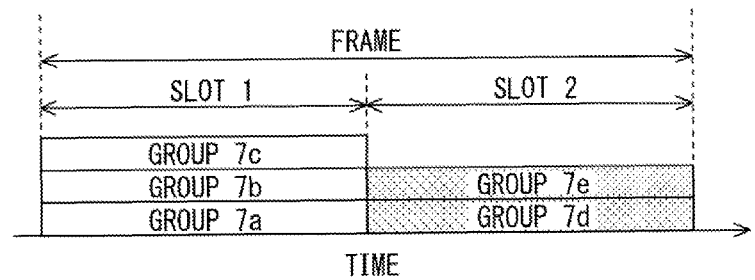
FIG. 6C is a view for illustrating examples of allocation of time slots.
Figure 6D:
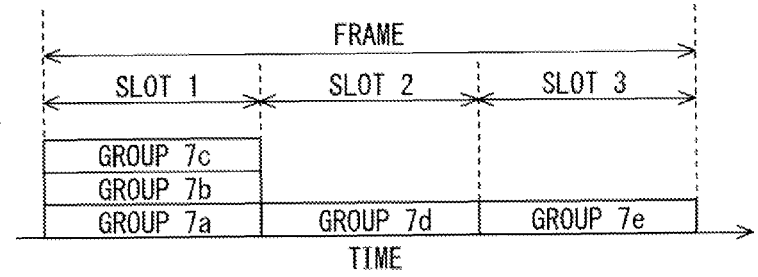
FIG. 6D is a view for illustrating examples of allocation of time slots.

For example, if, as depicted in FIG. 6C, the groups 7e and 7d remain to be interference increase group, the schedule determination unit 30 increases number of slots. Let us suppose the case where, as depicted in FIG. 6D, number of slots is increased by one, and a frame is divided into slots 1 to 3. The slot allocation unit 31 determines all allocation group numbers for slot 1 to 3 to be 1 so as to minimize difference of allocation group number between slots.

The slot allocation unit 31 allocates slots 1 to 3 to interference increase groups 6c to 6e, respectively. The schedule setting instruction output unit 32 generates schedule information generated in accordance with the slot allocation allocated by the slot allocation unit 31, and transmits the schedule setting instruction to representative nodes 6. In this manner, the interference increase group specifying unit 27 and the schedule determination unit 30 repeat addition and allocation of slots until there is no interference increase group.

When there is no interference increase group, the interference increase group specifying unit 27 transmits operation start instruction to each representative node 6. The representative node 6 transfers the operation start instruction to child nodes 6 of respective groups 7. Each operating node 6 repeats operation and stop in accordance with the start time and stop time designated by the last received schedule setting instruction.

The above-described operation of the packet transmission unit 20 and the packet reception unit 21 is executed by the processor 10 cooperating with the wireless communication circuit 13 as depicted in FIG. 1. The above-described operation of the route control unit 22, the grouping unit 24, the representative node notification unit 25, the reference delay measurement control unit 26, the interference increase group specifying unit 27 and the schedule determination unit 30 is executed by the processor 10. The operation of the network connection unit 23 is executed by the processor 11 cooperating with NIF circuit 14.

<3.3. Operation of Gateway Node>

Figure 8:
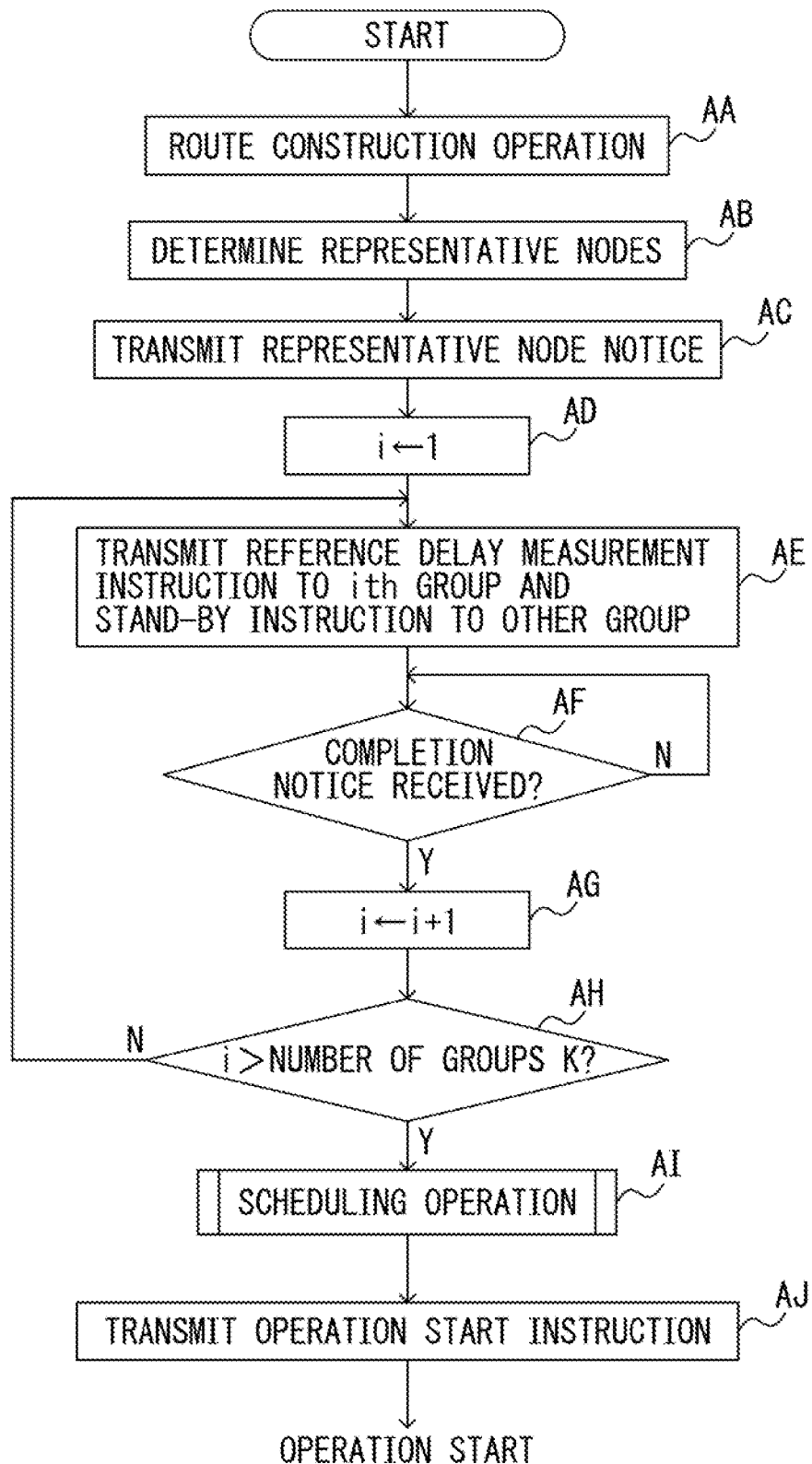
FIG. 8 is a view for illustrating an example of operation of the gateway node apparatus.

Next, operation of the gateway 5 will be described. FIG. 8 is a view for illustrating an example of operation of the gateway 5. A series of operations described with reference to FIG. 8 may be construed as a method including a plurality of steps. In this case, "operation" can be replaced by "step". This also applies to operations described with reference to FIG. 9 to FIGS. 12, 15, 16, 18 and 22. In operation AA, the route control unit 22 constructs the route of the network 2. in operation AB, the grouping unit 24 specifies representative nodes 6, and groups the nodes 6 into groups 7a to 7e. In operation AC, the representative node notification unit 25 transmits the representative node notice to representative nodes 6.

In following operations AD to AH, the reference delay measurement control unit 26 causes each representative node 6 to measure reference delay Dr. In operation AD, value of the variable i identifying each group 7a to 7e is set in 1. In operation AE, the reference delay measurement control unit 26 transmits the reference delay measurement instruction to the representative node 6 of the i-th group 7, and transmits the stand-by instruction to other representative nodes 6, thereby causing the representative node 6 of the i-th group 7 to measure the reference delay Dr.

In operation AF, the reference delay measurement control unit 26 waits for the completion notice from the representative node 6 of the i-th group 7 to be received. While the completion notice is not received (operation AF: N), the processing repeats operation AF. If the completion notice is received (operation AF: Y), the processing proceeds to operation AG.

In operation AG, the value of the variable i is increased by one. In operation AH, the reference delay measurement control unit 26 determines whether or not the value of the variable i exceeds total number of groups K, that is, whether or not the reference delay has been measured for all the groups 7. If the value of the variable i exceeds total number of groups K (operation AH: Y), the processing proceeds to operation AI. If the value of the variable i does not exceed a total number of groups K (operation AH: N), the processing returns to operation AE.

In operation AI, the interference increase group specifying unit 27 and the schedule determination unit 30 execute scheduling operation for determining operating time of each group 7. Content of the scheduling operation in operation AI will be described later. When scheduling operation has been finished, in operation AJ, the interference increase group specifying unit 27 transmits operation start instruction to the representative nodes 6.

Figure 9:
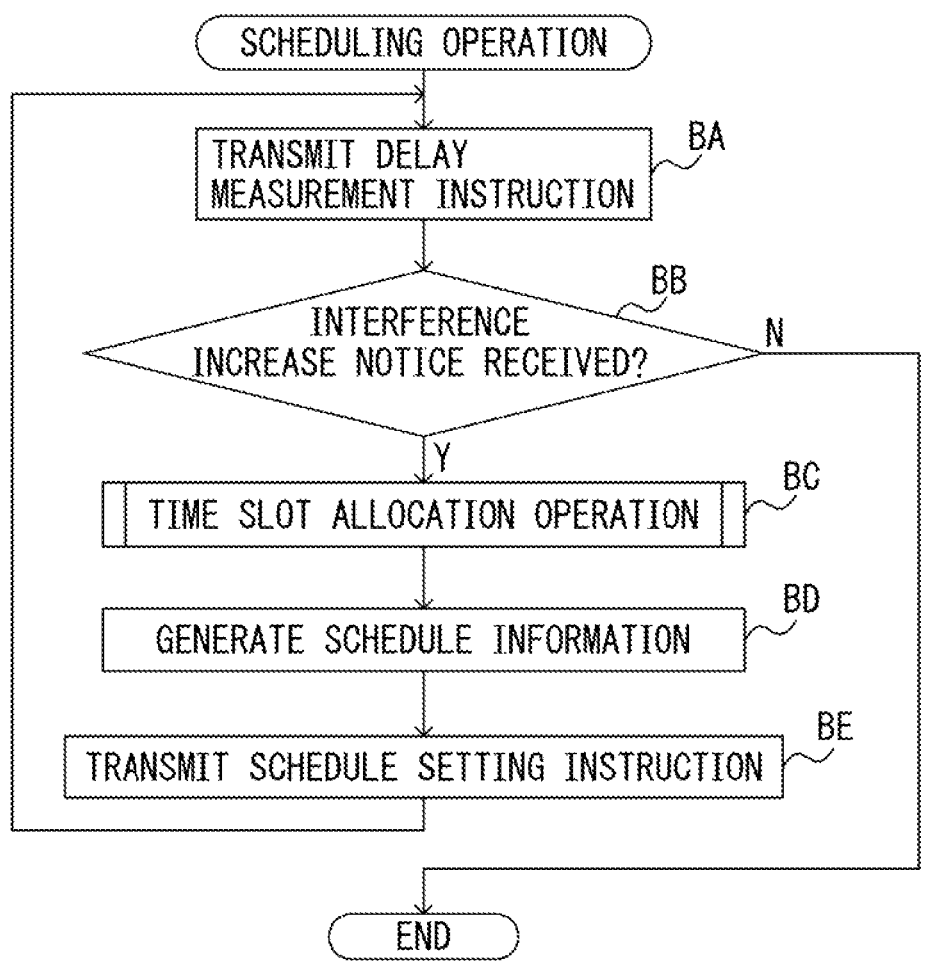
FIG. 9 is a view for illustrating an example of scheduling operation.

FIG. 9 is a view for illustrating an example of scheduling operation by the interference increase group specifying unit 27 and the schedule determination unit 30. In operation BA, the interference increase group specifying unit 27 transmits delay measurement instruction to each representative node 6 in a state in which all the groups 7 are operating in the same frame. The representative node 6 receiving the delay measurement instruction measures delay time Dm in its group 7, and determines whether or not the group the representative node belongs to is an interference increase group.

The representative node 6 of an interference increase group transmits an interference increase notice to the gateway 5. In operation BB, the interference increase group specifying unit 27 determines whether or not an interference increase notice has been received from any of the representative nodes 6. If an interference increase notice has been received (operation BB: Y), the processing proceeds to operation BC. If no interference increase notice has been received (operation BB: N), the scheduling operation is terminated.

In operation BC, the slot allocation unit 31 increases number of slots, and carries out time slot allocation operation for allocating slots after increase to the groups. Content of the time slot allocation operation will be described later. In operation BD, the schedule setting instruction output unit 32 generates schedule information based on the allocation result of the time slot allocation operation. In operation BE, the schedule setting instruction output unit 32 transmits the schedule setting instruction to the representative nodes 6. Thereafter, the processing returns to operation BA.

Figure 10:
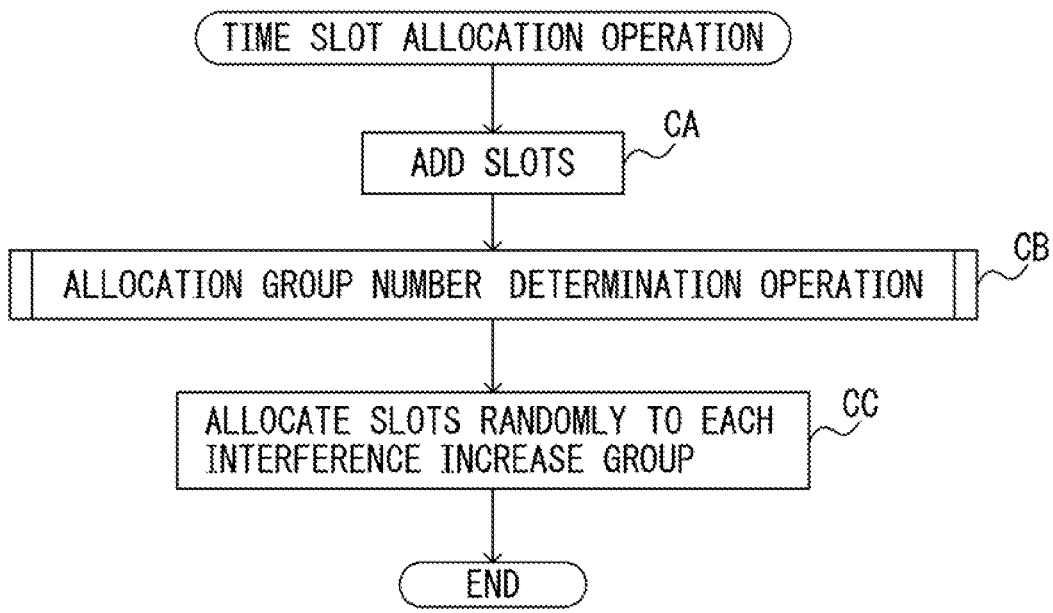
FIG. 10 is a view for illustrating a first example of time slot allocation processing.

FIG. 10 is a view for illustrating a first example of the time slot allocation operation by the slot allocation unit 31. In operation CA, the slot allocation unit 31 adds slots by increasing division number for dividing a frame into slots. In operation CB, the slot allocation unit 31 executes allocation group number determination operation for determining allocation group number of slots.

Figure 11:
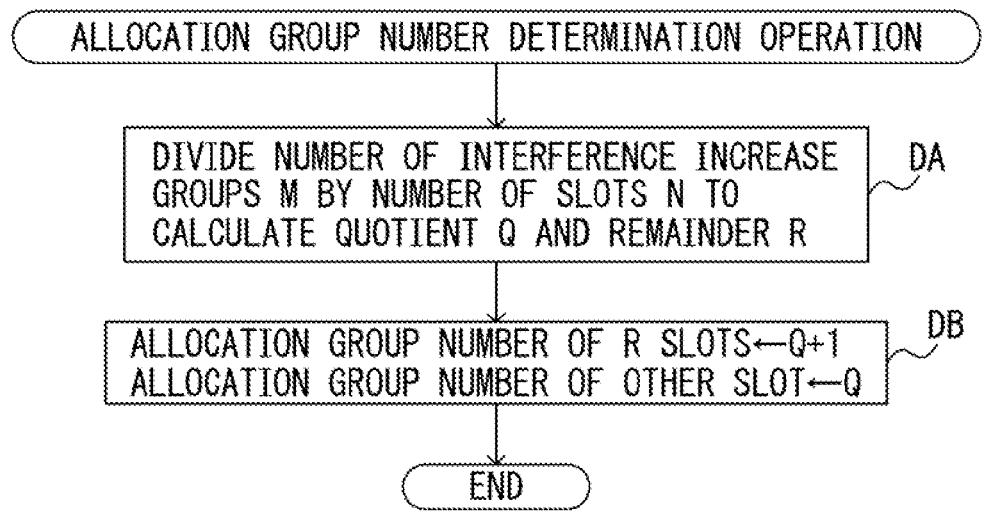
FIG. 11 is a view for illustrating a first example of allocated group number determination processing.

FIG. 11 is a view for illustrating a first example of the allocation group number determination operation. In operation DA, the slot allocation unit 31 divides number M of interference increase groups by number N of slots to obtain quotient Q and remainder R. In operation DB, the slot allocation unit 31 determines the allocation group number of arbitrary R slots from among N slots to be Q+1. The slot allocation unit 31 determines the allocation group number of remaining slots to be Q. As a result, difference of the allocation group number between slots is minimized to be "1" or "0".

Figure 12:
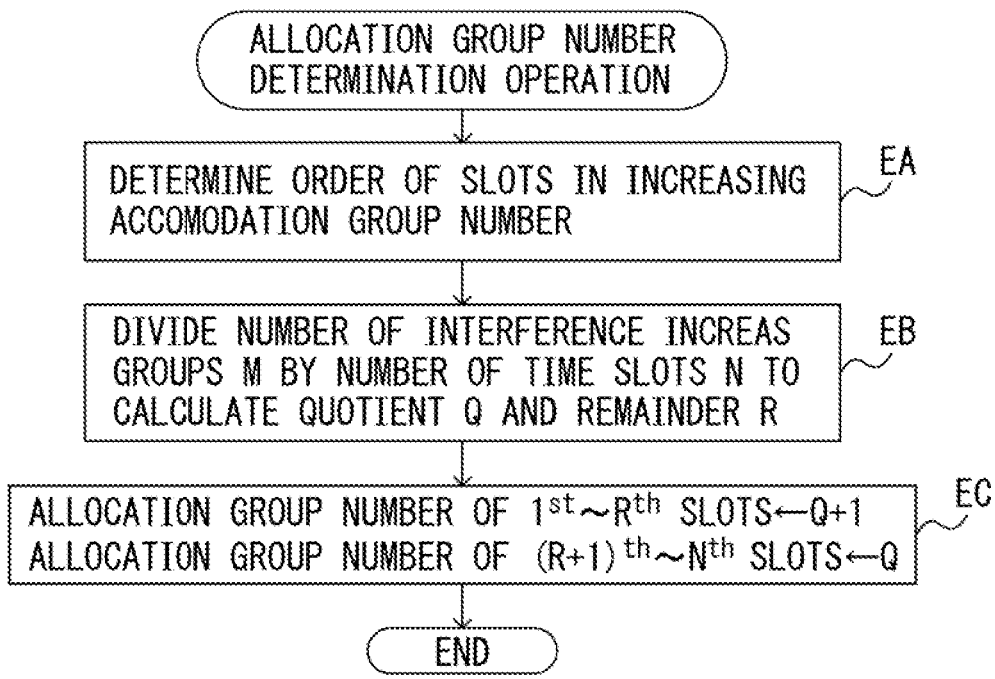
FIG. 12 is a view for illustrating a second example of allocated group number determination processing.

FIG. 12 is a view for illustrating a second example of the allocation group number determination operation. In operation EA, the slot allocation unit 31 determines the order of slots in increasing accommodation group number. In operation EB, the slot allocation unit 31 divides number M of interference increase groups by number N of slots to obtain quotient Q and remainder R. In operation EC, the slot allocation unit 31 determines the slot allocation number of the first to the R-th slots in the order determined in operation EA to be Q+1. The slot allocation number of the (R+1)-th to the N-th slots is determined to be Q. By determining the allocation in this way, deviation of number of groups operating in various slots is reduced so that possibility of occurrence of interference after reallocation can be reduced. Thereafter, the allocation group number determination operation is terminated.

Referring to FIG. 10, in operation CC, the slot allocation unit 31 allocates each slot to interference increase groups in allocation group number determined for each slot. Thereafter, the time slot allocation processing is terminated.

<3.4. Exemplary Hardware Construction of Sensor Node Apparatus>

Figure 13:
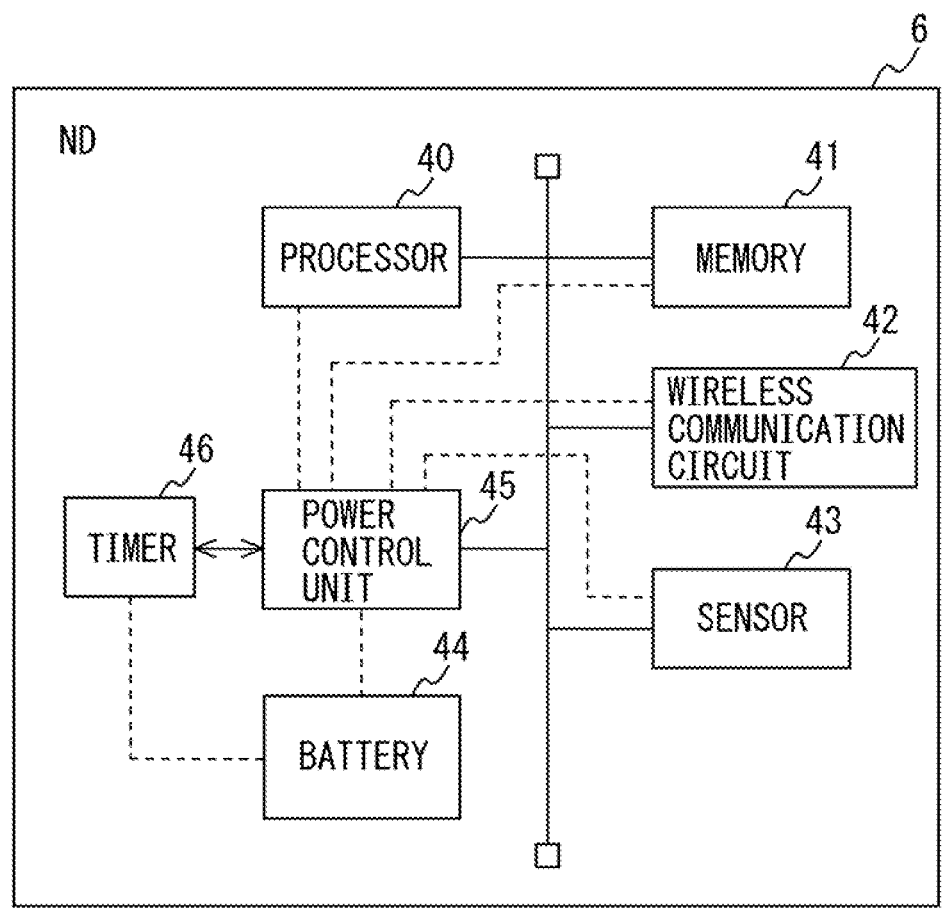
FIG. 13 is a view depicting an example of hardware construction of a sensor node apparatus.

Next, an exemplary embodiment of node 6 will be described. FIG. 13 is a view depicting an example of the hardware construction of the node 6. The node 6 includes a processor 40, a memory 41, a wireless communication circuit 42, a sensor 43, a battery 44, a power source control unit 45 and a timer 46. The hardware construction depicted in FIG. 13 is only an example of hardware construction for realizing the node 6. Any other hardware construction may be adopted as long as the operation described later in <3.6. Operation of representative node> and <3.7. Operation of child node> can be executed.

The processor 40 executes the control program stored in the memory 41 to thereby execute various operations for controlling the node 6 and operations to be described later. The memory 41 stores the control program to be executed by the processor 40, programs being executed and data temporarily used by these programs. The memory 41 may include a non-volatile memory, a read-only memory, or a random-access memory as storage devices.

The wireless communication circuit 42 performs wireless communication between the gateway 5 and the nodes 6. The sensor 43 detects physical quantities to be sensed by the node 6. The battery 44 supplies driving power of the node 6. In FIG. 13, the broken line indicates power line for supplying power from the battery 44 to various parts of the node 6. the power control unit 45 controls power supply from the battery 44 to various parts of the node 6 in accordance with the instruction of the processor 40. if the processor 40 designates pause period and issues pause command to the power control unit 45, the power control unit 45 shuts down power supply from the battery 44 to various parts of the node 6, while causing the timer 46 to count the designated pause period. The node 6 stops operation by shut-down of the power supply. When the timer 46 has finished counting of the pause period, the power control unit 45 resumes power supply to various parts of the node 6. The node 6 again starts operation upon start of power supply.

<3.5. Exemplary Functional Construction of Sensor Node Apparatus>

Figure 14:
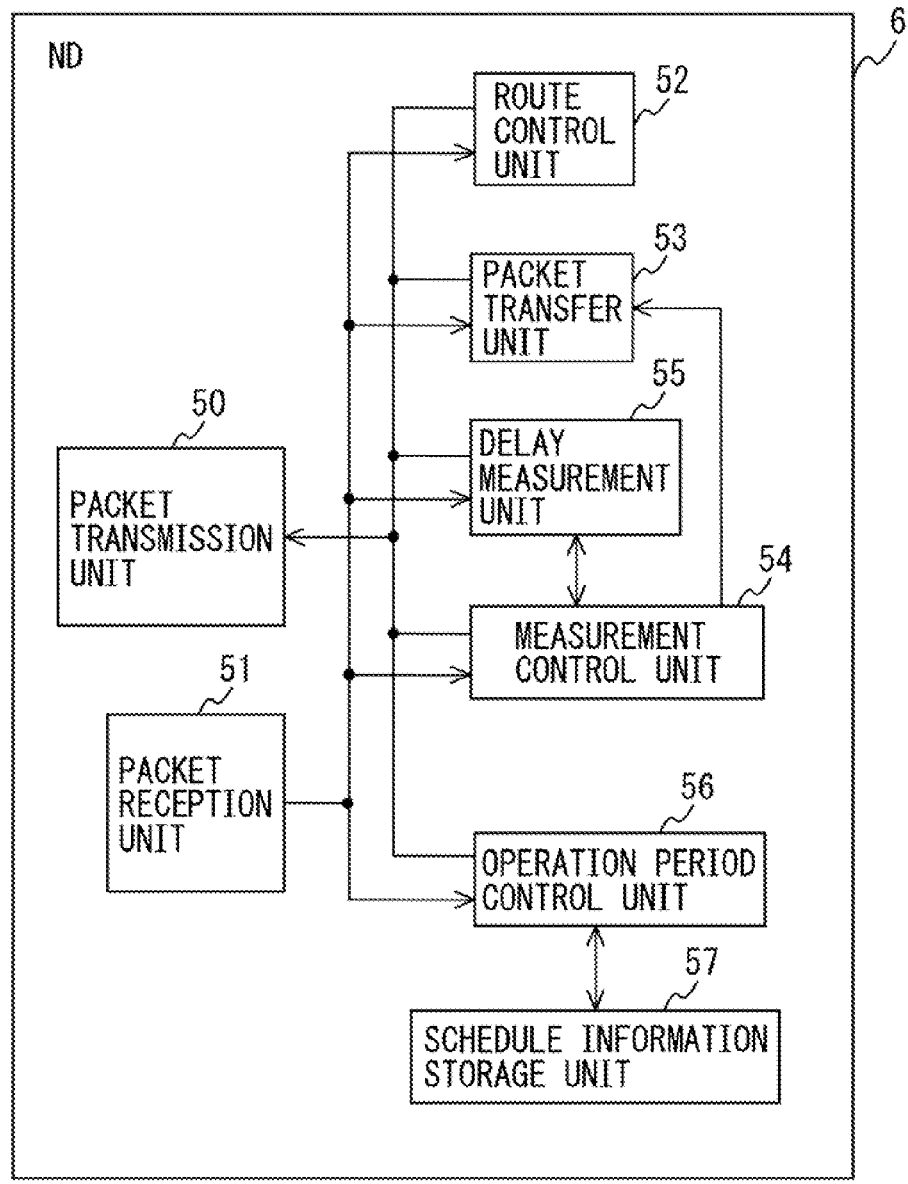
FIG. 14 is a view depicting a first example of functional block of the sensor node apparatus.

FIG. 14 is a view depicting a first example of functional block of the node 6. The node 6 includes a packet transmission unit 50, a packet reception unit 51, a route control unit 52, a packet transfer unit 53, a measurement control unit 54, a delay measurement unit 55, an operation period control unit 56 and a schedule information storage unit 57.

The packet transmission unit 50 and the packet reception unit 51 perform packet transmission to other nodes such as the gateway 5 and other nodes 6, and packet reception of packet transmitted from other nodes via the wireless communication channel realized by the wireless communication circuit 42. The route control unit 52 constructs routing of the network 2 by transmitting and receiving route control packets to and from the gateway 5 and the nodes 6 in accordance with the route control protocol. The packet transfer unit 53 performs transfer of packets received from other nodes.

The measurement control unit 54 executes reception of a representative node notice transmitted from the gateway 5. Upon reception of the representative node notice, the measurement control unit 54 operates the node 6 in representative node mode. If a representative node notice is not received, the measurement control unit 54 operates the node 6 in child node mode. Functions of the node 6 when operated in representative node mode will be described below.

<3.5.1. Functions at the Time of Representative Node Mode>

The measurement control unit 54 executes reception processing of a stand-by instruction transmitted from the gateway 5. Upon reception of the stand-by instruction, the measurement control unit 54 transmits the stand-by instruction to child nodes. Thereafter, the measurement control unit 54 stops packet transmission.

The measurement control unit 54 executes reception processing of reference delay measurement instruction transmitted from the gateway 5. Upon reception of the reference delay measurement instruction, the measurement control unit 54 outputs delay time measurement instruction to the delay measurement unit 55. Upon reception of the delay time measurement instruction from the measurement control unit 54, the delay measurement unit 55 transmits delay time measurement instruction to child nodes 6. The delay measurement unit 55 receives measurement packet transmitted from the child nodes 6 in response to the delay time measurement instruction, and from the time stamp included in the packet and present time, measures delay time of the measurement packet.

The delay measurement unit 55 outputs the maximum delay that is the largest delay among acquired delay times to the measurement control unit 54. The measurement control unit 54 stores the value of the maximum delay received as reference delay Dr in the memory 41. The measurement control unit 54 transmits a completion notice to the gateway 5.

The measurement control unit 54 executes reception processing of delay measurement instruction transmitted from the gateway 5. Upon reception of the delay measurement instruction, the measurement control unit 54 acquires the value of the maximum delay received from the delay measurement unit 55 as the delay time Dm.

The measurement control unit 54 determines whether or not the delay time difference, i.e., the delay time Dm minus the reference delay Dr, is greater than a prescribed margin δ. If the delay time difference is greater than the prescribed margin δ, the measurement control unit 54 determines that the group 7 the node 6 belongs to is an interference increase group. If the delay time difference is not greater than the prescribed margin δ, the measurement control unit 54 does not determine that the group 7 the node 6 belongs to is an interference increase group. If the group 7 the node 6 belongs to is an interference increase group, the measurement control unit 54 transmits an interference increase notice to the gateway 5.

The operation period control unit 56 executes reception processing of schedule setting instruction transmitted from the gateway 5. Upon reception of the schedule setting instruction, the operation period control unit 56 transmits the schedule setting instruction to child nodes. The operation period control unit 56 stores the schedule information included in the schedule setting instruction in the schedule information storage unit 57. The operation period control unit 56 sets, in accordance with the stop time and start time in each frame designated in the schedule information, the stop time and pause period in each frame. When the stop time in each frame comes, the operation period control unit 56 designates pause period and issues pause command to the power control unit 45.

The measurement control unit 54 executes reception processing of operation start instruction transmitted from the gateway 5. Upon reception of the operation start instruction, the measurement control unit 54 transmits the operation start instruction to child nodes. Upon reception of the operation start instruction, the measurement control unit 54 starts operation of the packet transfer unit 53 and starts operation of nodes 6.

<3.5.2. Functions at the Time of Child Node Mode>

Next, functions of the node 6 when operated in child node mode will be described. The measurement control unit 54 executes reception processing of stand-by instruction transmitted from the representative node 6. Upon reception of the stand-by instruction, the measurement control unit 54 transfers the stand-by instruction to the next child node, and thereafter stops packet transmission.

When delay measurement instruction is received from the representative node 6, the delay measurement unit 55 transmits a measurement packet including time stamp of transmission time to the representative node.

The operation period control unit 56 stores the schedule information included in the schedule setting instruction received from the representative node 6 in the schedule information storage unit 57. The operation period control unit 56 sets, in accordance with the stop time and start time in each frame designated in the schedule information, the stop time and pause period in each frame. When the stop time in each frame comes, the operation period control unit 56 designates pause period and issues pause command to the power control unit 45.

The measurement control unit 54 executes reception processing of operation start instruction transmitted from the representative node 6. Upon reception of the operation start instruction, the measurement control unit 54 starts operation of the packet transfer unit 53 and starts operation of the node 6.

The above-described operation of the packet transmission unit 50 and packet reception unit 51 is executed by the processor 40 depicted in FIG. 13 cooperating with the wireless communication circuit 42. The operation of the route control unit 52, the packet transfer unit 53, the measurement control unit 54, the delay measurement unit 55, and the operation period control unit 56 is executed by the processor 40. The schedule information stored in the schedule information storage unit 57 is accommodated in the memory 41.

<3.6. Operation of Representative Node>

Figure 15A:
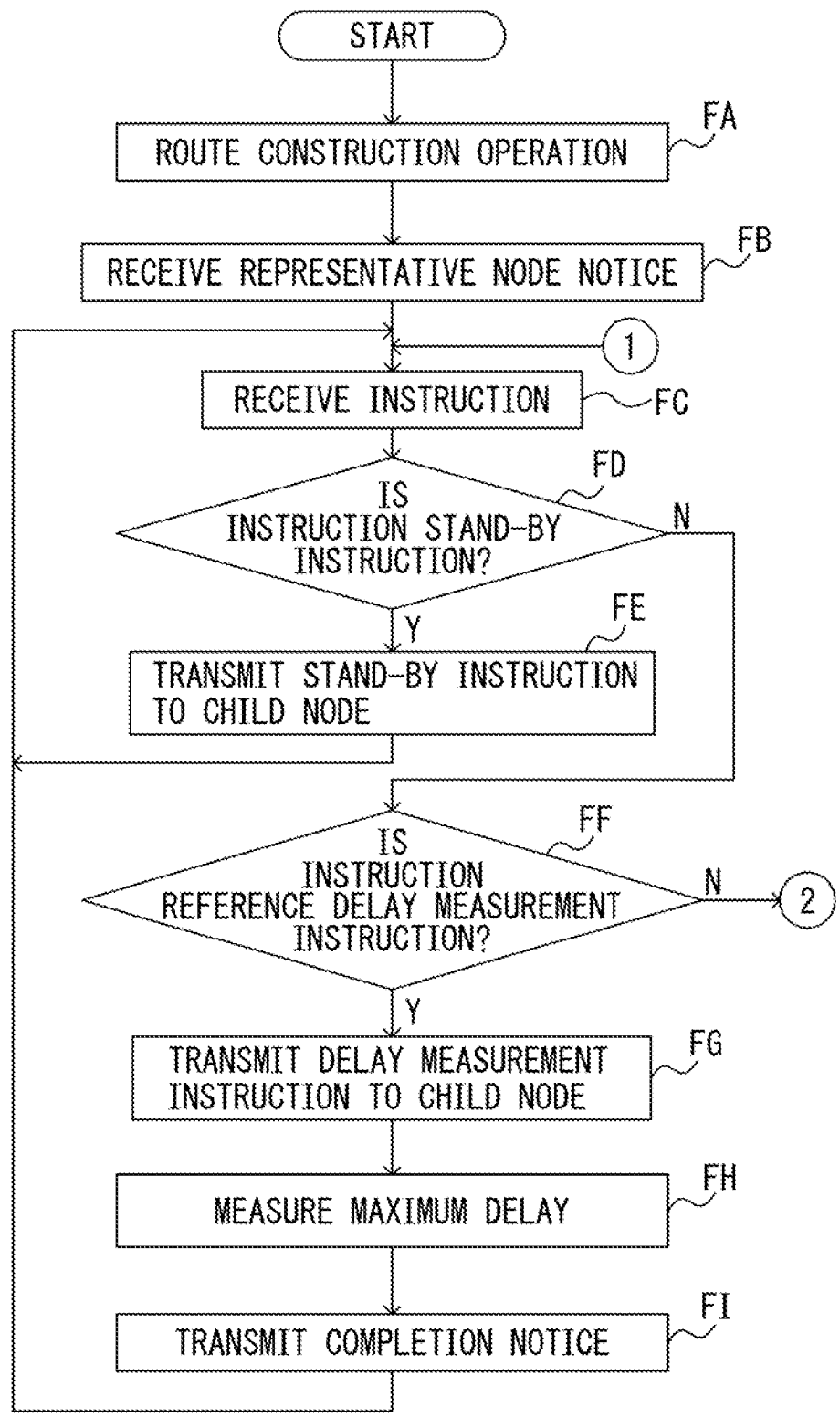
FIG. 15A is a view for illustrating an example of operation of the sensor node apparatus as a representative node.
Figure 15B:
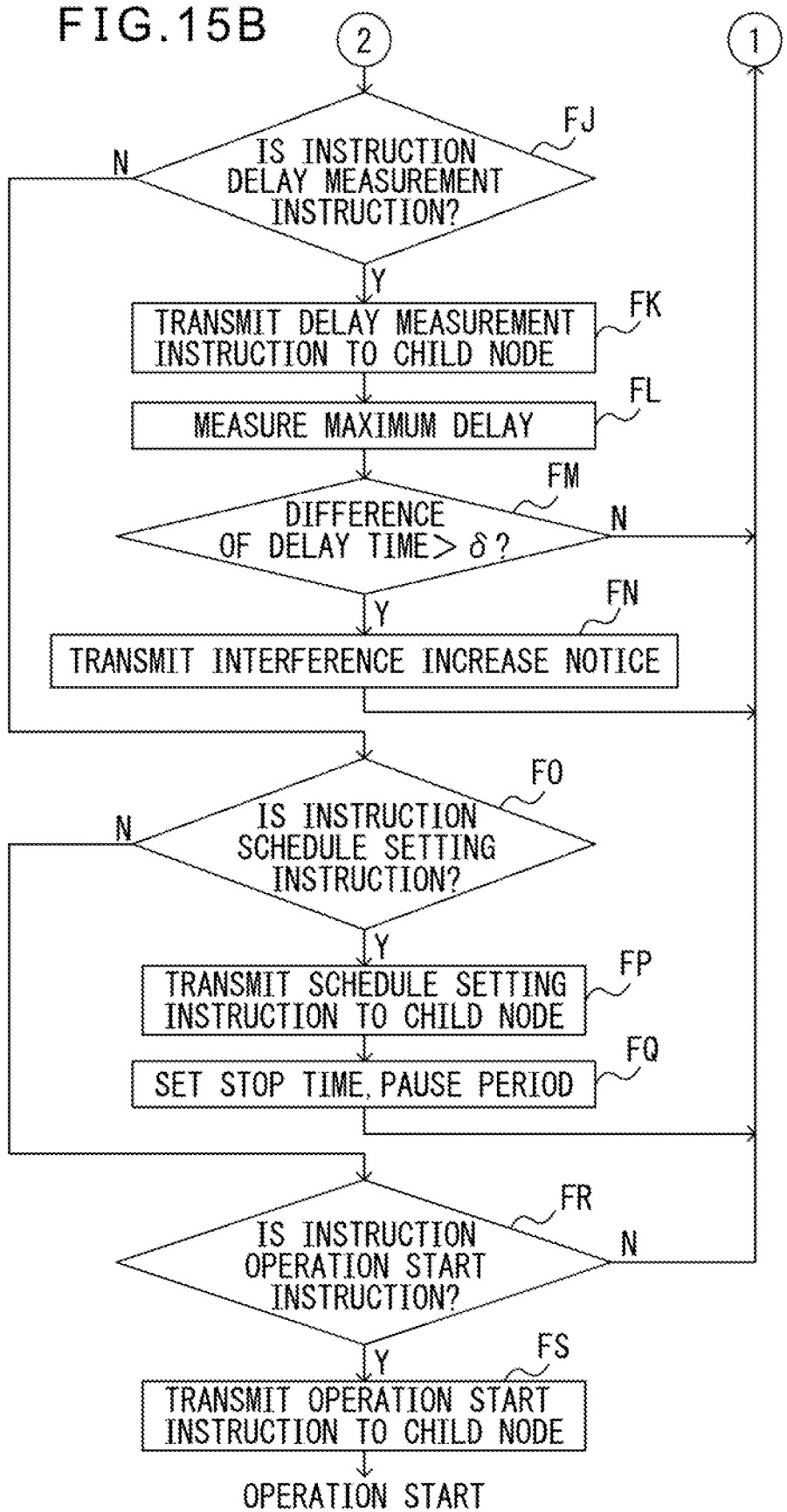
FIG. 15B is a view for illustrating an example of operation of the sensor node apparatus as a representative node.

Next, referring to FIGS. 15A and 15B, an example of operation of the representative node 6 will be described. In operation FA, the route control unit 52 constructs routing of the network 2. In operation FB, the measurement control unit 54 receives a representative node notice transmitted from the gateway 5.

In operation FC, the representative node 6 receives some instruction transmitted from the gateway 5. In operation FD, the measurement control unit 54 determines whether or not the received instruction is a stand-by instruction. If the received instruction is a stand-by instruction (operation FD: Y), the processing proceeds to operation FE. If the received instruction is not a stand-by instruction (operation FD: N), the processing proceeds to operation FF. In operation FE, the measurement control unit 54 transmits stand-by instruction to child nodes. Thereafter, the measurement control unit 54 stops packet transmission, and returns the processing to operation FC.

In operation FF, the measurement control unit 54 determines whether or not the received instruction is reference delay measurement instruction. If the received instruction is reference delay measurement instruction (operation FF: Y), the processing proceeds to operation FG. If the received instruction is not reference delay measurement instruction (operation FF: N), the processing proceeds to operation FJ. In operation FG, the delay measurement unit 55 transmits the delay measurement instruction to child nodes 6. In operation FH, the delay measurement unit 55 measures maximum delay. The measurement control unit 54 stores the value of the received maximum delay as reference delay Dr in the memory 41. In operation FI, the measurement control unit 54 transmits a completion notice to the gateway 5. Thereafter, the processing returns to operation FC.

In operation FJ, the measurement control unit 54 determines whether or not the received instruction is delay measurement instruction. If the received instruction is the delay measurement instruction (operation FJ: Y), the processing proceeds to operation FK. If the received instruction is not the delay measurement instruction (operation FJ: N), the processing proceeds to operation FO. In operation FK, the delay measurement unit 55 transmits the delay measurement instruction to child nodes 6. In operation FL, the delay measurement unit 55 measures the maximum delay.

In operation FM, the measurement control unit 54 determines whether or not the delay difference is greater than a prescribed margin δ. If the delay difference is greater than the prescribed margin δ (operation FM: Y), the processing proceeds to operation FN. If the delay difference is not greater than the prescribed margin δ (operation FM: N), the processing returns to operation FC. In operation FN, the measurement control unit 54 transmits an interference increase notice to the gateway. Thereafter, the processing returns to operation FC.

In operation FO, the operation period control unit 56 determines whether or not the received instruction is schedule setting instruction. If the received instruction is schedule setting instruction (operation FO: Y), the processing proceeds to operation FP. If the received instruction is not schedule setting instruction (operation FO: N), the processing proceeds to operation FR. In operation FP, the operation period control unit 56 transmits the schedule setting instruction to child nodes. In operation FQ, the operation period control unit 56 sets stop time and pause period of the representative node 6. Thereafter, the processing returns to operation FC.

In operation FR, the measurement control unit 54 determines whether or not the received instruction is operation start instruction. If the received instruction is operation start instruction (operation FR: Y), the processing proceeds to operation FS. If the received instruction is not operation start instruction (operation FR: N), the processing returns to operation FC. In operation FS, the measurement control unit 54 transmits the operation start instruction to child nodes. Thereafter, the operation of the representative node starts.

<3.7. Operation of Child Node>

Figure 16:
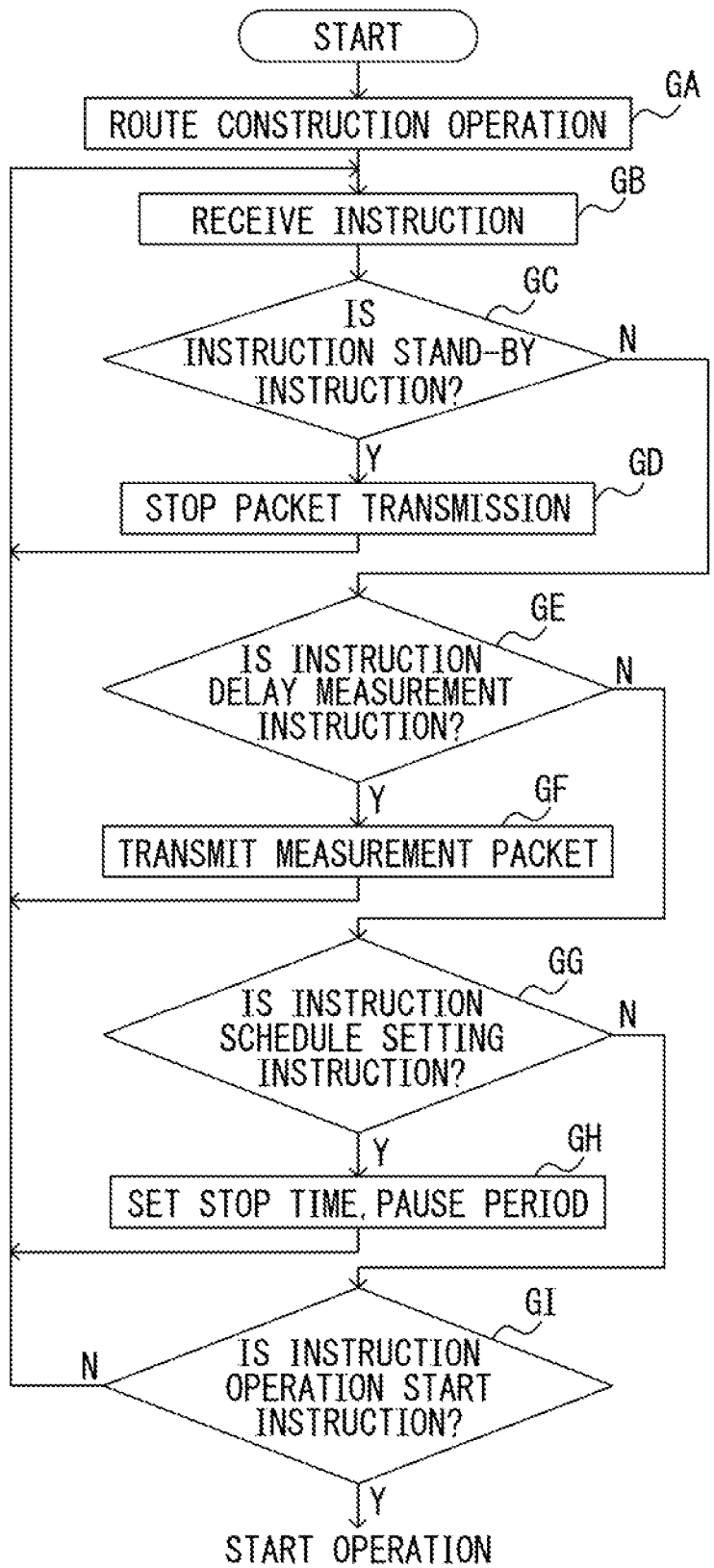
FIG. 16 is a view for illustrating an example of operation of the sensor node apparatus as an child node.

Next, referring to FIG. 16, an example of operation of an child node 6 will be described. In operation GA, the route control unit 52 constructs the route of the network 2. In operation GB, the child node 6 receives some instruction transmitted from the representative node 6. In operation GC, the measurement control unit 54 determines whether or not the received instruction is a stand-by instruction. If the received instruction is a stand-by instruction (operation GC: Y), the processing proceeds to operation GD. If the received instruction is not a stand-by instruction (operation GC: N), the processing proceeds to operation GE. In operation GD, the measurement control unit 54 transfers the stand-by instruction to next child node and stops packet transmission. Thereafter, the processing proceeds to operation GB.

In operation GE, the measurement control unit 54 determines whether or not the received instruction is a delay measurement instruction. If the received instruction is a delay measurement instruction (operation GE: Y), the processing proceeds to operation GF. If the received instruction is not a delay measurement instruction (operation GE: N), the processing proceeds to operation GG. In operation GF, the delay measurement unit 55 transmits a measurement packet including time stamp of transmission time to the representative nodes. Thereafter, the processing returns to operation GB.

In operation GG, the operation period control unit 56 determines whether or not the received instruction is a schedule setting instruction. If the received instruction is a schedule setting instruction (operation GG: Y), the processing proceeds to operation GH. If the received instruction is not a schedule setting instruction (operation GG: N), the processing proceeds to operation GI. In operation GH, the operation period control unit 56 sets stop time and pause period for child nodes. Thereafter, the processing returns to operation GB.

In operation GI, the measurement control unit 54 determines whether or not the received instruction is an operation start instruction. If the received instruction is an operation start instruction (operation GI: Y), operation of child nodes start. If the received instruction is not an operation start instruction (operation GI: N), operation returns to operation GB.

<3.8. Effect of Exemplary Embodiment>

In accordance with the present exemplary embodiment, in a wireless multi-hop network 2, number of nodes 6 transmitting packets in the same period is decreased, so that interference between nodes 6 can be reduced. Degradation of performance of the wireless multi-hop network 2 due to interference associated with increase of nodes 6 can be relieved. By allocating same slot to the nodes 6 of same group 7, transmission delay due to packet relay in the same group 7 not being completed in 1 frame can be reduced. Also, in accordance with the present exemplary embodiment, interference arising between nodes 6 of different groups 7 operating in the same slot can be reduced.

In the present exemplary embodiment, allocation of operation period to each node 6 is controlled based on the state of interference of packet transmission between nodes 6. Thus, in accordance with the present exemplary embodiment, allocation of operation period can be controlled without need of new measurement means for position information or setting work such as acquisition of position information or setting of nodes 6. Further, range of radio wave may vary due to various factors other than position of nodes 6. Therefore, in accordance with the present exemplary embodiment, allocation of operation period can be controlled in a manner more adapted to actual interference as compared to control based on position information of nodes 6.

Also, in accordance with the present exemplary embodiment, operation of each node is stopped in period other than the allocated slot, so that power consumption can be reduced.

Also, in the present exemplary embodiment, a slot of same length is allocated to each node 6. By allocating slot of same length, difference of power consumption between nodes 6 can be reduced. As a result, since difference of battery consumption between nodes 6 decreases, battery maintenance of the nodes can be performed at the same time, and therefore, battery procurement schedule can be formulated more easily. For example, battery of nodes in a remote location can be maintained collectively, and labor of travel can be saved.

<3.9. Variant>

In the above-described exemplary embodiment, an interference increase group is determined by using maximum value of packet delay time as an index indicating the degree of interference. In the variant, maximum value of PER of packet communication between representative node 6 and child nodes 6 in each group may be used as an index indicating the degree of interference. This applies also to other exemplary embodiment to be described below.

Also, in the variant, individual slot length may be varied in accordance with maximum value of delay time of groups accommodated in the slot. For this purpose, the measurement control unit 54 of the representative nodes 6 may transmit reference delay Dr in place of or in addition to a completion notice to the gateway 5. This applies also to other exemplary embodiment to be described below.

In the above-described exemplary embodiment, the slot allocation unit 31 increases number of slots in division of frame each time. In the variant, increase of number of slots in each division of frame is 2 or more. This applies also to other exemplary embodiment to be described below. Also, in the variant, packet transmission from the representative node to the gateway 5 may be executed as polling by the gateway 5. For example, the interference increase specifying unit 27 receives an interference increase notice from representative nodes by polling. By packet transmission from representative node 6 executed as polling by the gateway 5, packet collision between representative nodes can be avoided. This applies also to other exemplary embodiment to be described below.

4. Second Exemplary Embodiment

Next, other exemplary embodiment of the network 2 will be described. When there is interference between different groups 7, it is possible that the degree of interference increases not only in one of the groups but also in both groups. Therefore, in the present exemplary embodiment, if there are plural groups 7 having relatively large increase in the degree of interference as compared to when these groups 7 are operated alone, different slots are allocated to these groups 7. By allocating slots in this manner, interference between groups 7 can be expected to be resolved.

Figure 17A:
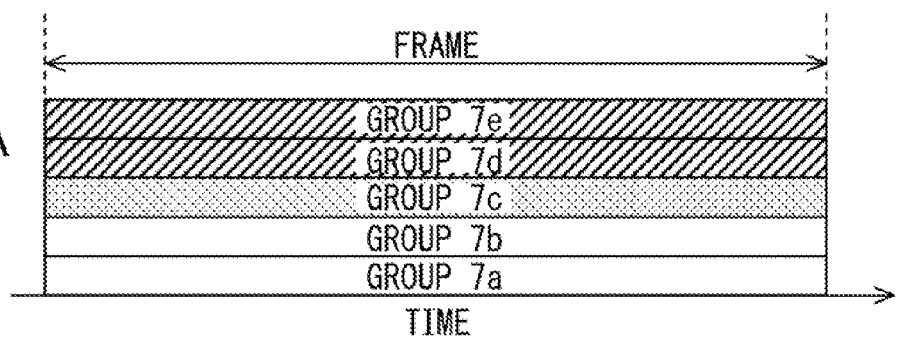
FIG. 17A is a view for illustrating an example of occurrence of interference increase group.

FIG. 17A is a view depicting an example of occurrence of interference increase groups before frame division used in the description of the second exemplary embodiment. Suppose that, in the interference increase groups 7d and 7e, increase of the degree of interference is relatively large as compared to when these groups are respectively operated alone, and in the interference increase group 7c, increase of the degree of interference is relatively small as compared to when these groups are respectively operated alone. In the description that follows, the group in which increase of the degree of interference is relatively large is denoted as "first group", and the group in which increase of the degree of interference is relatively small is denoted as "second group".

Figure 17B:
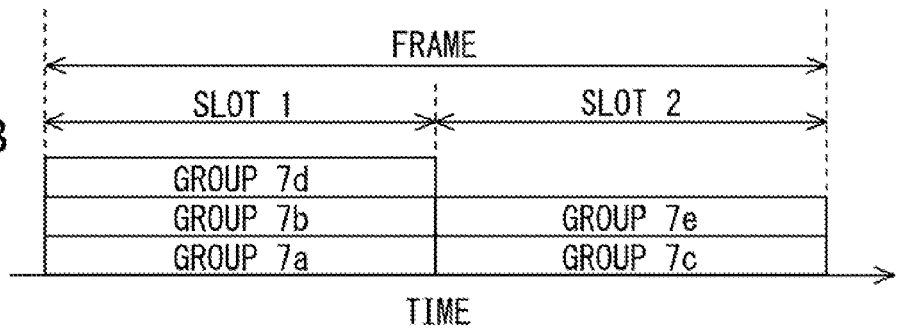
FIG. 17B is a view for illustrating an example of time slot allocation.

FIG. 17B depicts an example of allocation of time slots in the present exemplary embodiment. The slot allocation unit 31 allocates different slots 1 and 2 to the two first groups 7d and 7e. At this time, the slot allocation unit 31 allocates the first group such that difference of allocation group number of the first group between slots is minimized.

The accommodation group number of slot 1 and slot 2 after the slots 1 and 2 are allocated to the two first groups 7d and 7e are "3" and "1", respectively. The slot allocation unit 31 allocates slot to the second group after allocating slots to the first group. At this time, the slot allocation unit 31 allocates the second group such that difference of allocation group number of the second groups between slots is minimized. If the remainder of number of the second groups divided by number of slots is not "0", the slot allocation unit 31 may allocate the remaining second groups successively to slots in the order of small accommodation group number. In this example, the second group 7c is allocated to the second slot.

Figure 18:
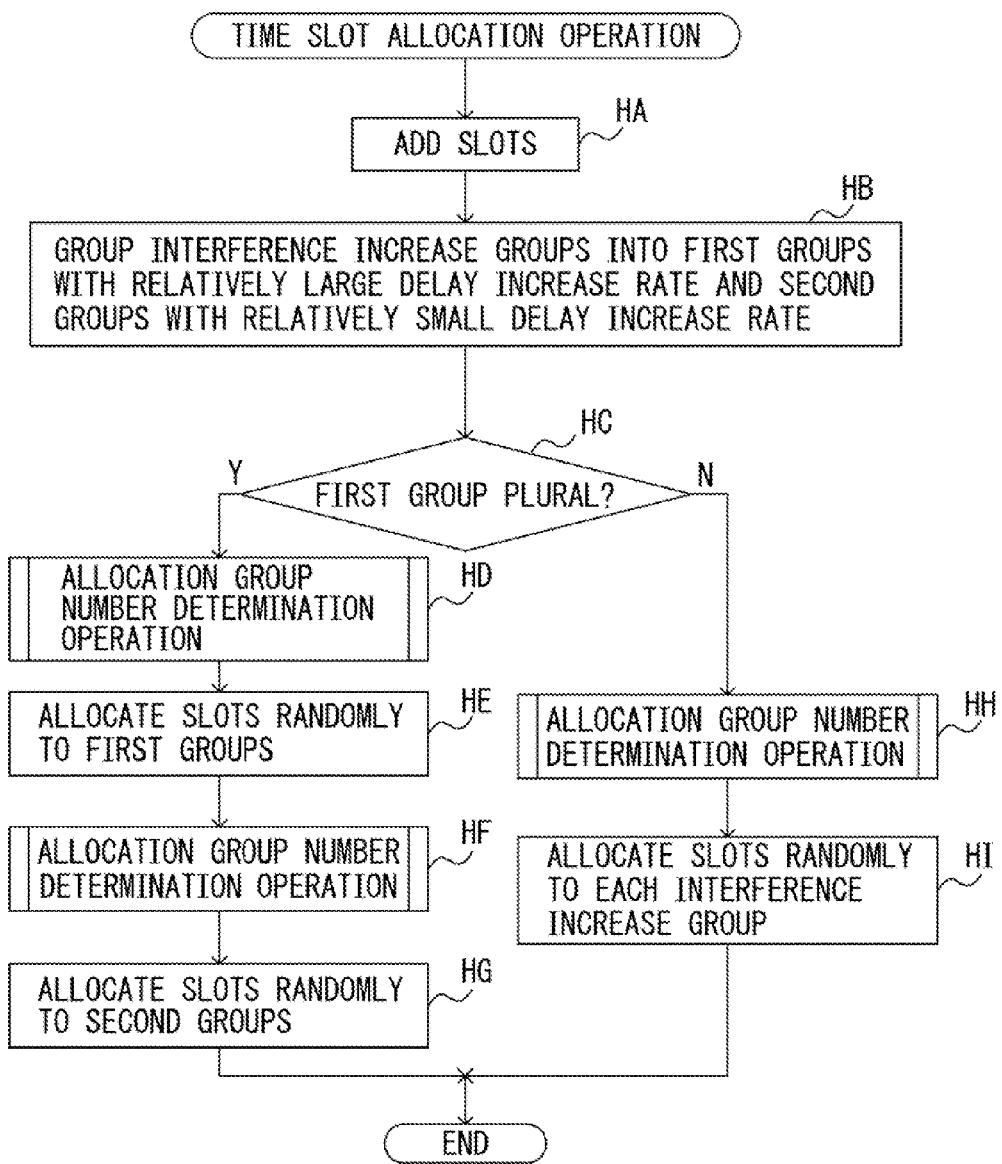
FIG. 18 is a view for illustrating a second example of time slot allocation processing.

Referring to FIG. 18, time slot allocation operation of the present exemplary embodiment will be described. In operation HA, the slot allocation unit 31 adds slots by increasing division number for dividing a frame into slots. In operation HB, the slot allocation unit 31 groups the interference increase groups 7 into first groups with relatively large delay increase rate and second groups with relatively small delay increase rate. An example of delay increase rate is the ratio of delay time Dm to reference delay Dr. The measurement control unit 54 of the representative node 6 may calculate delay increase rate and transmit it in addition to an interference increase notice to the gateway 5.

In operation HC, the slot allocation unit 31 determines whether or not first groups are plural. If first groups are plural (operation HC: Y), the processing proceeds to operation HD. If first groups are not plural (operation HC: N), the processing proceeds to operation HH.

In operation HD, the slot allocation unit 31 executes allocation group number determination operation to determine allocation group number of first groups. Content of the allocation group number determination operation may be the same as the allocation group number determination operation depicted in FIG. 11 or FIG. 12. In operation HE, the slot allocation unit 31 allocates each slot to first groups in allocation group number determined for each slot.

In operation HF, the slot allocation unit 31 executes allocation group number determination operation to determine allocation group number of second groups. Content of the allocation group number determination operation may be the same as the allocation group number determination operation depicted in FIG. 11 or FIG. 12. In operation HG, the slot allocation unit 31 allocates each slot to second groups in allocation group number determined for each slot. Thereafter, time slot allocation operation is terminated. On the other hand, the processing in operations HH and HI is the same as the processing in operations CB and CC depicted in FIG. 10. Thereafter, time slot allocation operation is terminated.

In accordance with the present exemplary embodiment, different slots can be allocated to plural interference increase groups for which interference between groups 7 may have arisen. Thus, it is expected that interference arising between groups 7 can be resolved.

In a variant, it is possible that groups with relatively large delay increment be classified as first groups and groups with relatively small delay increment be classified as second groups. Delay increment may be increment of Dm relative to reference delay Dr.

In the variant, PER increase rate or PER increment may be used for grouping. The representative node 6 measures, in a state in which each group 7 is operating alone, the maximum value of PER of packet communication between the representative node 6 and child nodes 6 in each group. This measured value is denoted as "reference PER". Next, the representative node 6 measures, in a state in which all groups 7 are operating in the same frame, the maximum value of PER of packet communication between the representative node 6 and child nodes 6 in each group. This measured value is denoted as "measured PER". PER increase rate is ratio of the measured PER to the reference PER. PER increment is increment of the measured PER relative to the reference PER.

In the variant, the gateway 5 may calculate delay increase rate or delay increment. To this end, the measurement control unit 54 of the representative node 6 may transmit the reference delay Dr and delay time Dm to the gateway 5. The gateway 5 may calculate PER increase rate or PER increment. The measurement control unit 54 of the representative node 6 may transmit PER increase rate and PER increment to the gateway 5.

5. Third Exemplary Embodiment

Next, another exemplary embodiment will be described. The gateway 5 of the present exemplary embodiment allocates different length of slots in accordance with the maximum value of delay time of the allocated group. By allocating slots of different length based on the delay time, nodes 6 can be operated in each group 7 in accordance with the time used for relaying packets, so that utilization efficiency of the battery can be improved.

Figure 19A:
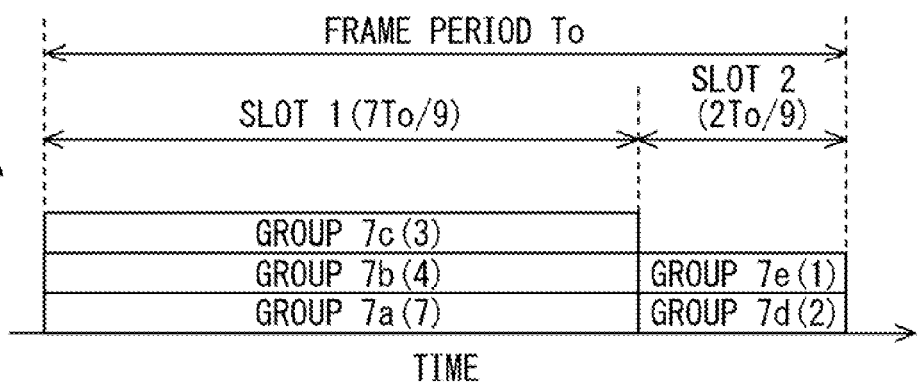
FIG. 19A is a view for illustrating exemplary setting of slot length when slots are allocated in different mode to same plural groups.
Figure 19B:
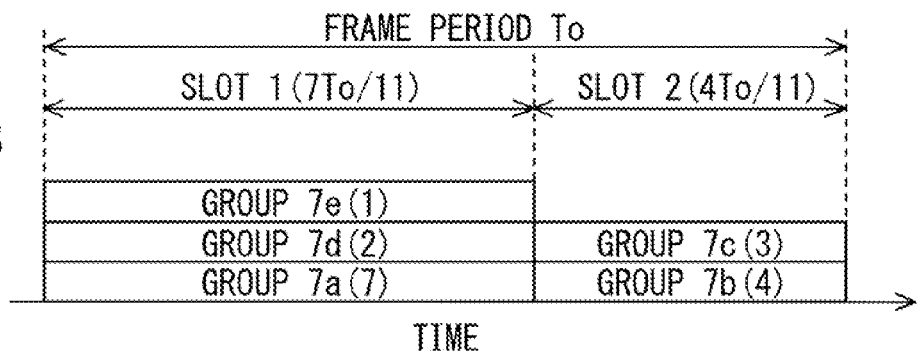
FIG. 19B is a view for illustrating exemplary setting of slot length when slots are allocated in different mode to same plural groups.

FIG. 19A and FIG. 19B are views depicting examples of setting slot length in the case where slot 1 and slot 2 are allocated in different mode to same plural groups 7a to 7e. In the example depicted in FIG. 19A, slot 1 is allocated to groups 7a to 7c, and slot 2 is allocated to groups 7d and 7e. In the example depicted in FIG. 19B, slot 1 is allocated to groups 7a, 7d and 7e, and slot 2 is allocated to groups 7b and 7c.

The case where indices of delay time of the group 7a to 7e are respectively "7", "4", "3", "2", and "1" is supposed. In the example of FIG. 19A, the maximum values of delay time of the groups to which slot 1 and slot 2 is allocated are respectively "7" and "2". Let frame period be $T_0$ and if ratio of slot length of slot 1 to slot 2 is determined in accordance with the ratio of these maximum values, then slot lengths of slot 1 and slot 2 are respectively "$7T_0/9$" and "$2T_0/9$".

On the other hand, in the example of FIG. B, the maximum values of delay time of the groups to which slot 1 and slot 2 is allocated are respectively "7" and "4". Therefore, slot lengths of slot 1 and slot 2 are respectively "$7T_0/11$" and "$4T_0/11$".

From comparison of the example of FIG. 19A and the example of FIG. 19B, it can be seen that, in the example of FIG. 19A, difference of delay time between groups in slot 1 is "3" and difference of delay time between groups in slot 2 is "1", and total sum is "4". In the example of FIG. 19B, difference of delay time between groups in slot 1 is "6" and difference of delay time between groups in slot 2 is "1", and total sum is "7".

In the case as seen from the example of FIG. 19A where total sum of difference of delay time is less, same slot tends to be allocated to groups 7 having similar delay time. As a result, difference of slot length between slots is likely to arise, so that the slot length of slot allocated to groups with smaller delay time becomes shorter. As a result, the slot length of slot allocated to groups with larger delay time can be set longer.

On the contrary, in the case as seen from the example of FIG. 19B where total sum of difference of delay time is larger, it is less probable that same slot is allocated to groups 7 having similar delay time. As a result, difference of slot length between slots is unlikely to arise, so that the slot length of slot allocated to groups with smaller delay time does not become shorter. As a result, the slot length of slot allocated to groups with larger delay time is not set longer. As a result, difference of delay time between individual group 7 is unlikely to affect difference of slot length, so that improvement of battery utilization efficiency by adopting different slot length in accordance with maximum value of delay time of groups is reduced. Therefore, in the present exemplary embodiment, in time slot allocation operation for allocating slots to groups 7, same slot is allocated to groups of similar delay time.

Figure 20:
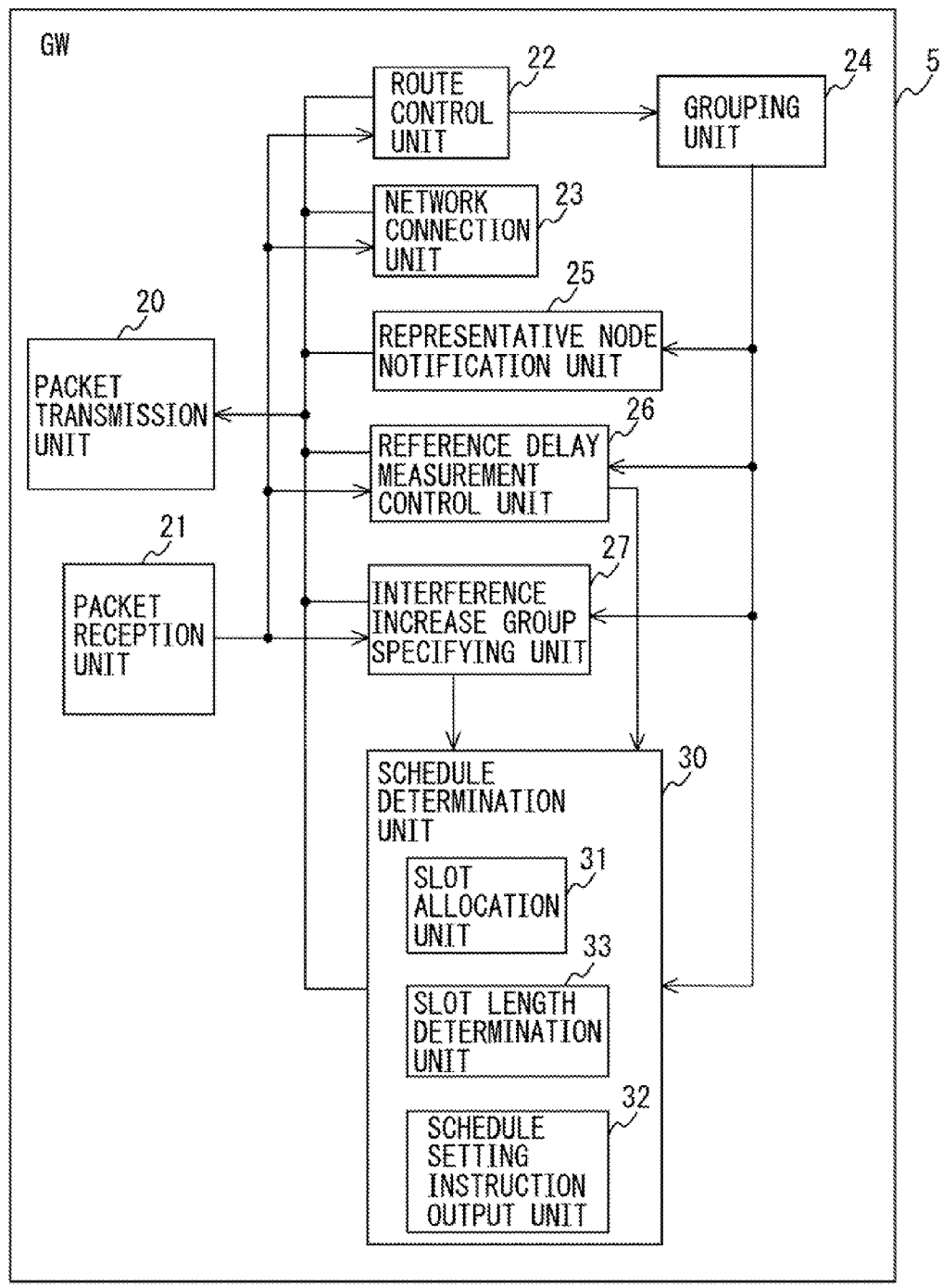
FIG. 20 is a view depicting a second example of functional block of a gateway node apparatus.

FIG. 20 is a view depicting a second example of functional block of the gateway 5. The gateway 5 has the construction similar to the construction depicted in FIG. 5, and same constituents as the constituents depicted in FIG. 5 are denoted by same reference numerals or symbols as used in FIG. 5. The schedule determination unit 30 includes a slot length determination unit 33.

The reference delay measurement control unit 26 receives reference delay information indicating reference delay Dr from the representative node 6. The measurement control unit 54 of the representative node 6 transmits the reference delay information to the gateway 5. After the allocation group number determination operation depicted in FIG. 11 or FIG. 12, the slot allocation unit 31 determines candidate slots to be allocated to interference increase groups.

FIG. 21A depicts an example of occurrence of interference increase groups used in the description of the third exemplary embodiment. Here, the case where interference increase groups before frame division are 7b to 7e, and indices of delay time of groups 7a to 7e are "7", "4", "3", "2" and "1" is considered.

When the slot allocation unit 31 divides a frame into slot 1 and slot 2, number of interference increase groups "4" divided by number of slots "2" gives quotient "2". Therefore, the slot allocation unit 31 determines allocation group number of slot 1 and slot 2 to be 2. If group 7a, which is not an interference increase group, is allocated to slot 1, the table of candidate slots to be allocated to groups 7a to 7e is as depicted in FIG. 21B.

For example, in the first mode of allocation, slot 1 is allocated to groups 7a to 7c, and slot 2 is allocated to groups 7d and 7e. In the second mode of allocation, slot 1 is allocated to groups 7a, 7b and 7d, and slot 2 is allocated to groups 7c and 7e.

The slot allocation unit 31 determines, for each slot in the determined allocation mode, difference of delay time between groups accommodated in the slot. For example, in the first allocation mode, difference of delay time in slot 1 is the difference "4" between the maximum value "7" and the minimum value "3", and difference of delay time in slot 2 is the difference "1" between the maximum value "2" and the minimum value "1". Also, for example, in the second allocation mode, difference of delay time in slot 1 is the difference "5" between the maximum value "7" and the minimum value "2", and difference of delay time in slot 2 is the difference "2" between the maximum value "3" and the minimum value "1".

The slot allocation unit 31 determines, in the determined allocation mode, whether or not the difference of delay time is less than a threshold Th in all slots. If the slot allocation unit 31 finds an allocation mode in which the difference of delay time is less than the threshold Th, the slot allocation unit 31 allocates slots in the allocation mode. In this example, if the threshold is chosen as "5", then the difference of delay time "4" in the first allocation mode is less than the threshold Th. Therefore, the slot allocation unit 31 uses the first allocation mode to allocate slots. FIG. 21C depicts allocation of time slots in accordance with the first allocation mode.

If allocation mode in which difference of delay time is less than the threshold Th in all slots is not found, the slot allocation unit 31 calculates total sum of difference of delay time between groups over all slots, for each of determined allocation modes. The slot allocation unit 31 allocates slots in the allocation mode which gives the least total sum.

The slot length determination unit 33 determines the slot length of each slot in accordance with the ratio of maximum value of delay time of groups allocated to each slot.

Figure 22:
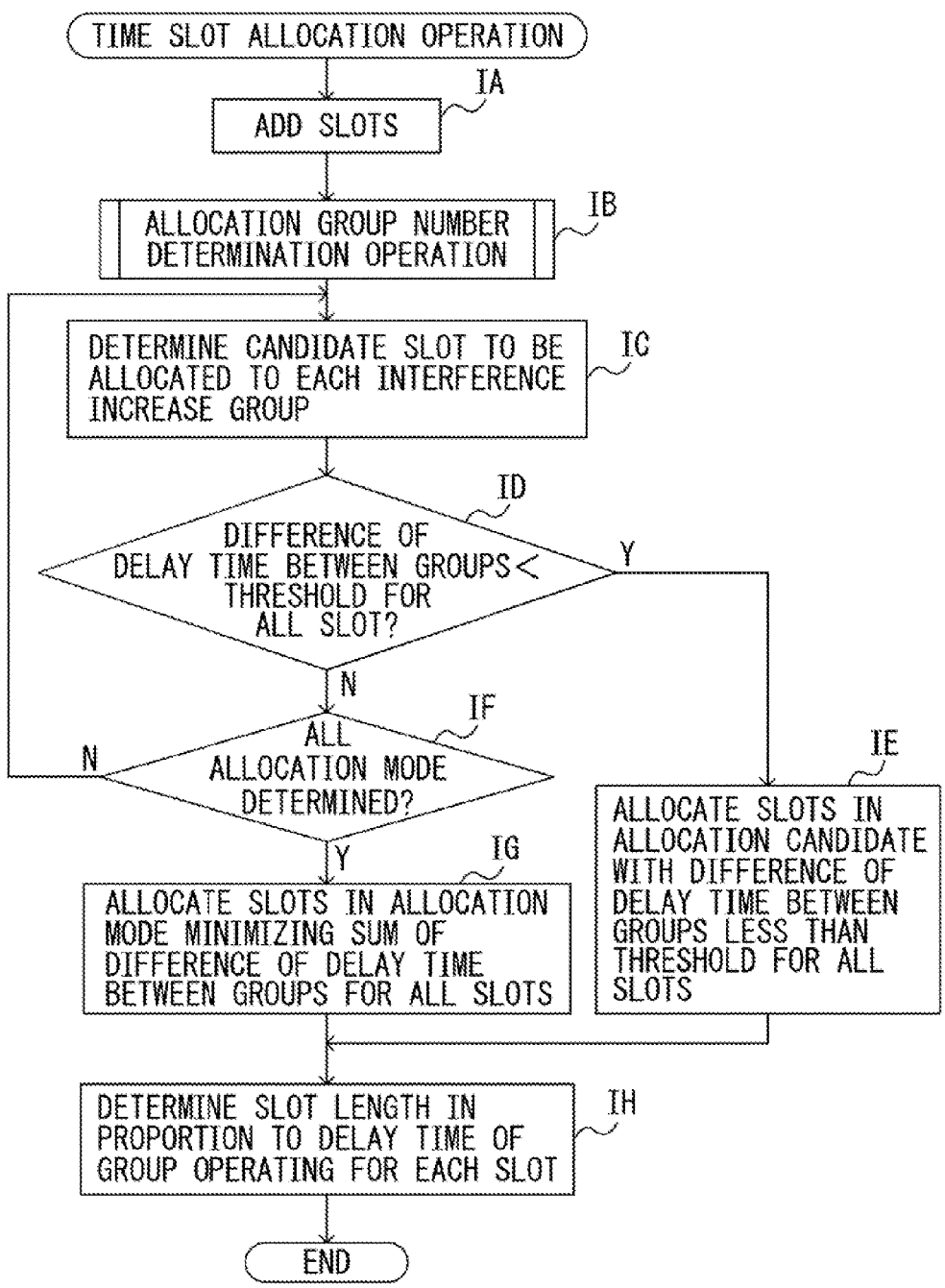
FIG. 22 is a view for illustrating a third example of time slot allocation processing.

FIG. 22 is a view for illustrating a third example of time slot allocation operation. In operation IA, the slot allocation unit 31 adds slots. In operation IB, the slot allocation unit 31 executes allocation group number determination operation.

Content of the allocation group number determination operation may be the same as the allocation group number determination operation depicted in FIG. 11 or FIG. 12.

In operation IC, the slot allocation unit 31 determines candidate slots to be allocated to interference increase groups. In operation ID, the slot allocation unit 31 determines, in the determines allocation mode, whether or not the difference of delay time between groups accommodated in each slot is less than the threshold Th for all slots. If difference of time delay is less than the threshold Th for all slots (operation ID: Y), the processing proceeds to operation IE. If difference of time delay is not less than the threshold Th for any one slot (operation ID: N), the processing proceeds to operation IF. In operation IE, the slot allocation unit 31 allocates candidate slots such that difference of delay time is less than the threshold Th for all slots. Thereafter, the processing proceeds to operation IH.

In operation IF, the slot allocation unit 31 determines whether or not determination has been finished for all allocation modes in operation ID. If determination has been finished for all allocation modes (operation IF: Y), the processing proceeds to operation IG. If determination has not been finished for any allocation mode (operation IF: N), the processing returns to operation IC, and operations IC to IF is executed for allocation modes no yet finished.

In operation IG, the slot allocation unit 31 calculates total sum of difference of delay time between groups over all slots for each allocation mode, and allocates slots in the allocation mode which gives the least total sum. In operation IH, the slot length determination unit 33 determines slot length of each slot. Thereafter, the time slot allocation operation is terminated.

In accordance with the present exemplary embodiment, packet length is chosen to be different depending on delay time of packets in each group 7, so that difference is provided in operation time of nodes in accordance with time used for relaying packets. Utilization efficiency of battery is thereby improved.

In the variant, the slot length determination unit 33 may choose equal slot length for all slots.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A gateway apparatus that connects a multi-hop network of a tree structure formed of node apparatuses to another network, comprising:
   a processor performing a computer program stored in a non-transitory storing medium;
   a grouping section, implemented using the processor, that groups, for each representative node apparatus having a direct link to the gateway apparatus in the tree structure, the nodes belonging to a subtree having a same representative node as a root, into a node group;
   an interference group specifying section, implemented using the processor, that specifies a node group in which packet communication in the node group is subjected to an interference of a degree exceeding a threshold as an interference group; and
   a slot allocation section, implemented using the processor, that allocates one time slot among a plurality of time slots included in a frame which is a packet transmission period of the node apparatus to one interference group among a plurality of interference groups as a packet transmission period, and allocates another time slot among the plurality of time slots to another interference group among the plurality of interference groups as a packet transmission period.

2. The gateway apparatus according to claim 1, wherein, if the interference group specifying unit specifies occurrence of interference groups, the slot allocation unit increases number of time slots included in 1 frame.

3. The gateway apparatus according to claim 1, wherein the threshold is an index indicating the degree of interference to which packet communication in the node group is subjected when each node group is operated alone.

4. The gateway apparatus according to claim 1, wherein the slot allocation unit divides a frame into a plurality of time slots of equal length.

5. The gateway apparatus according to claim 1, further comprising a slot length determination unit that adjusts slot length of time slot allocated to the node group in accordance with packet delay time occurring in the node group.

6. The gateway apparatus according to claim 1, wherein the slot allocation unit allocates time slots such that difference of number of interference groups to which each time slot is allocated between time slots is minimized.

7. The gateway apparatus according to claim 1, wherein the slot allocation unit classifies the plurality of interference groups into first groups in which excess of the degree of interference over the threshold is larger and second groups in which excess of the degree of interference over the threshold is smaller, and allocates one time slot from among the plurality of time slots to one interference group from among the first groups as the packet transmission period, and allocates another time slot from among the plurality of time slots to another interference group from among the first groups as the packet transmission period.

8. The gateway apparatus according to claim 1, wherein the slot allocation unit allocates the time slots to node groups such that difference of packet delay time produced in the node groups having same time slot allocated thereto is smaller than a threshold.

9. The gateway apparatus according to claim 1, wherein the slot allocation unit allocates the time slots to node groups such that a total sum of difference of packet delay time produced in the node groups having a same time slot allocated thereto summed over all time slots is smaller than a threshold.

10. The gateway apparatus according to claim 1, wherein the degree of interference to which packet communication in the node group is subjected is determined based on packet delay time occurring in the node group or on packet error rate occurring in the node group.

11. The gateway apparatus according to claim 1, wherein the interference group specifying unit receives a signal, by polling from the representative node apparatuses having a direct link to the gateway apparatus in the tree structure, a signal which notifies that the node group having the representative node apparatus as the root is an interference group.

12. A node apparatus forming a multi-hop network of tree structure connected to another network by a gateway apparatus, comprising:

a processor performing a computer program stored in a non-transitory storing medium;

an interference measurement section, implemented using the processor, that measures the degree of interference to which packet communication in the node group the node apparatus belongs to is subjected, the node group being one of a plurality of node groups grouping, for each representative node apparatus having direct link to the gateway apparatus in the tree structure, node apparatuses belonging to subtrees respectively having representative node apparatuses as roots; and an interference notification section, implemented using the processor, that outputs to the gateway apparatus the result of comparison of the degree of interference measured when the node group to which the node apparatus belongs is operated alone with the degree of interference measured when the node group to which the node apparatus belongs is operated simultaneously with another node group from among the plurality of node groups.

13. A communication system comprising a multi-hop network of tree structure formed of node apparatuses and a gateway apparatus connecting the multi-hop network to another network:

wherein the gateway apparatus comprises;

a processor performing a computer program stored in a non-transitory storing medium;

a grouping section, implemented using the processor, that groups, for each representative node apparatus having a direct link to the gateway apparatus in the tree structure, the nodes belonging to a subtree having the representative node as a root, into a node group;

an interference group specifying section, implemented using the processor, that specifies a node group in which packet communication in the node group is subjected to an interference of a degree exceeding a threshold as an interference group; and a slot allocation section, implemented using the processor, that allocates one time slot among a plurality of time slots included in a frame which is a packet transmission period of the node apparatus to one interference group among a plurality of interference groups as a packet transmission period, and allocates another time slot among the plurality of time slots to another interference group among the plurality of interference groups as a packet transmission period.

14. A control method for controlling operation period of node apparatuses forming a multi-hop network of tree structure connected to other network by a gateway apparatus, comprising:

grouping, for each representative node apparatus having a direct link to the gateway apparatus in the tree structure, the node apparatuses belonging to a subtree having the representative node apparatus as the root into a node group;

specifying a node group in which packet communication is subjected to interference of a degree exceeding a threshold as an interference group; and allocating one time slot from among a plurality of time slots included in a frame as a packet transmission period of the node apparatus to one interference group from among a plurality of interference groups as a packet transmission period, and another time slot from among the plurality of time slots to another interference group from among the plurality of interference groups as a packet transmission period.

15. A computer-readable, non-transitory medium storing a computer program for causing a processor comprised in a gateway apparatus connecting a multi-hop network of tree structure formed of node apparatuses to other network to execute:

grouping, for each representative node apparatus having a direct link to the gateway apparatus in the tree structure, the node apparatuses belonging to a subtree having the representative node apparatus as the root into a node group;

specifying a node group in which packet communication is subjected to interference of a degree exceeding a threshold as an interference group; and allocating one time slot from among a plurality of time slots included in a frame as a packet transmission period of the node apparatus to one interference group from among a plurality of interference groups as a packet transmission period, and another time slot from among the plurality of time slots to another interference group from among the plurality of interference groups as a packet transmission period.

* * * * *